US006647735B2

(12) United States Patent
Street et al.

(10) Patent No.: US 6,647,735 B2
(45) Date of Patent: Nov. 18, 2003

(54) DISTRIBUTED INTELLIGENCE CONTROL FOR COMMERCIAL REFRIGERATION

(75) Inventors: Norman E. Street, O'Fallon, MO (US); Ted W. Sunderland, O'Fallon, MO (US); Charles D. Thomas, St. Louis, MO (US); Doron Shapiro, St. Louis, MO (US); Michael J. D'Anna, Eureka, MO (US); Dennis Doerr, St. Charles, MO (US)

(73) Assignee: Hussmann Corporation, Bridgeton, MO (US)

( * ) Notice: Subject to any disclaimer, the term of this patent is extended or adjusted under 35 U.S.C. 154(b) by 86 days.

(21) Appl. No.: 09/849,900

(22) Filed: May 4, 2001

(65) Prior Publication Data

US 2002/0020175 A1 Feb. 21, 2002

Related U.S. Application Data

(63) Continuation-in-part of application No. PCT/US01/08072, filed on Mar. 14, 2001, which is a continuation-in-part of application No. 09/524,939, filed on Mar. 14, 2000, now Pat. No. 6,332,327.

(51) Int. Cl.[7] .............................................. F25B 49/02

(52) U.S. Cl. ............................. 62/132; 62/175; 236/51

(58) Field of Search ........................ 62/132, 126, 127, 62/129, 130, 175, 125; 236/51, 94; 165/11.1

(56) References Cited

U.S. PATENT DOCUMENTS

| 3,312,081 A | 4/1967 | Berger et al. |
| 3,527,059 A | 9/1970 | Rust et al. |
| 3,735,377 A | 5/1973 | Kaufman |

(List continued on next page.)

OTHER PUBLICATIONS

AS Interface (ASI) News—"AS–Interface accepted as European Standard", 1 page, available at http://www.as–interface.com/news/en50295.html on Sep. 23, 1999.

(List continued on next page.)

Primary Examiner—Harry B. Tanner
(74) Attorney, Agent, or Firm—Michael Best & Friedrich LLP

(57) ABSTRACT

A commercial refrigeration system has a control system which distributes intelligence to increase granularity of the control and simplify wiring, assembly and installation. Compressors of the refrigeration system each have a bus compatible compressor safety and control module including a processor and sensors. All control and safety modules communicate over a single power and communications line with the controller, providing digital transmissions to the controller of measurements taken by the sensors. The information provided may include that the compressor is outside of a specific safety parameter, so that the controller knows not only that a safety parameter has been traversed, but exactly which one. The control and safety modules are capable of executing commands from the controller to cycle the compressors. The control and safety modules preferably contain sufficient intelligence to continue system operation upon failure of the controller. A compressor is also disclosed which has an intelligent control and safety module. The compressor also houses control and safety devices within a hermetically or semi-hermetically sealed shell. A condenser controller is also disclosed that is capable of communicating with the controller to affect intelligent control of one or more compressor fans. A valve controller is disclosed that is capable of communicating with the controller to facilitate distributed control of a system control valve with minimal wiring. A branch controller also communicates with the controller, resulting in distributed control of a refrigeration branch with minimal wiring required. Display/fixture control is achieved using display and control modules that collect data from a plurality of sensors on a common wiring harness. Wiring is also reduced by providing for wireless communication interfaces.

19 Claims, 16 Drawing Sheets

U.S. PATENT DOCUMENTS

| | | |
|---|---|---|
| 3,783,681 A | 1/1974 | Hirt et al. |
| 4,060,716 A | 11/1977 | Pekrul et al. |
| 4,071,078 A | 1/1978 | Padden |
| 4,084,388 A | 4/1978 | Nelson |
| 4,102,394 A | 7/1978 | Botts |
| 4,152,902 A | 5/1979 | Lush |
| 4,184,341 A | 1/1980 | Friedman |
| 4,325,223 A | 4/1982 | Cantley |
| 4,333,316 A | 6/1982 | Stamp, Jr. et al. |
| 4,372,119 A | 2/1983 | Gillbrand et al. |
| 4,384,462 A | 5/1983 | Overman et al. |
| 4,390,321 A | 6/1983 | Langlois et al. |
| 4,390,922 A | 6/1983 | Pelliccia |
| 4,399,548 A | 8/1983 | Castleberry |
| 4,425,010 A | 1/1984 | Bryant et al. |
| 4,429,578 A | 2/1984 | Darrel et al. |
| 4,479,389 A | 10/1984 | Anderson, III et al. |
| 4,545,210 A | 10/1985 | Lord |
| 4,614,089 A | 9/1986 | Dorsey |
| 4,748,820 A | 6/1988 | Shaw |
| 4,811,897 A | 3/1989 | Kobayashi et al. |
| 4,812,997 A | 3/1989 | Okochi et al. |
| 4,829,779 A | 5/1989 | Munson et al. |
| 4,842,044 A | 6/1989 | Flanders et al. |
| 4,884,412 A | 12/1989 | Sellers et al. |
| 4,909,076 A | 3/1990 | Busch et al. |
| 4,913,625 A | 4/1990 | Gerlowski |
| 4,951,029 A | 8/1990 | Severson |
| 4,958,502 A | 9/1990 | Satoh et al. |
| 4,967,567 A | 11/1990 | Proctor et al. |
| 5,050,397 A | 9/1991 | Sugiyama et al. |
| 5,056,036 A | 10/1991 | Van Bork |
| 5,062,278 A | 11/1991 | Sugiyama |
| 5,065,591 A | 11/1991 | Shaw |
| 5,109,700 A | 5/1992 | Hicho |
| 5,123,256 A | 6/1992 | Oltman |
| 5,131,237 A | 7/1992 | Valbjern |
| 5,142,877 A | 9/1992 | Shimizu |
| 5,203,178 A | 4/1993 | Shyu |
| 5,224,835 A | 7/1993 | Oltman |
| 5,231,846 A | 8/1993 | Goshaw et al. |
| 5,249,429 A | 10/1993 | Hanson |
| 5,327,742 A | 7/1994 | Duff et al. |
| 5,362,206 A | 11/1994 | Westerman et al. |
| 5,381,692 A | 1/1995 | Winslow et al. |
| 5,390,206 A | 2/1995 | Rein et al. |
| 5,448,230 A | 9/1995 | Schanker et al. |
| 5,460,006 A | 10/1995 | Torimitsu |
| 5,465,081 A | 11/1995 | Todd |
| 5,509,786 A | 4/1996 | Mizutani et al. |
| 5,515,693 A | 5/1996 | Cahill-OBrien et al. |
| 5,533,347 A | 7/1996 | Ott et al. |
| 5,566,879 A | 10/1996 | Longtin |
| 5,577,390 A | 11/1996 | Kaido et al. |
| 5,586,444 A | 12/1996 | Fung |
| 5,592,824 A | 1/1997 | Sogabe et al. |
| 5,602,757 A | 2/1997 | Haseley et al. |
| 5,610,339 A | 3/1997 | Haseley et al. |
| 5,626,027 A | 5/1997 | Dormer et al. |
| 5,630,324 A | 5/1997 | Yoshida et al. |
| 5,647,223 A | 7/1997 | Wada et al. |
| 5,701,482 A | 12/1997 | Harrison et al. |
| 5,707,210 A | 1/1998 | Ramsey et al. |
| 5,763,959 A | 6/1998 | Chambers |
| 5,975,854 A | 11/1999 | Culp, III et al. |
| 5,984,645 A | 11/1999 | Cummings |
| 6,125,642 A | 10/2000 | Seener et al. |
| 6,302,654 B1 | 10/2001 | Millet et al. |
| 6,332,327 B1 | 12/2001 | Street et al. |

OTHER PUBLICATIONS

AS Interface (ASI) News—"Technical Enhancements Extend AS–Interface Capabilities", 2 page, dated Oct. 28, 1998, available at http://www.as–interface.com/news/en50295.html on Sep. 23, 1999.

Siemens Manual, "Actuator Sensor Interface—System Description", May 1996, Siemens Aktiengesellschaft, Germany, 63 pages.

Siemens Manual, "Actuator–Sensor Interface", 1999, Siemens Energy & Automation, Inc., Batavia, Illinois, 128 pages.

Echelon Corporation—"Introduction to the LonWorks® System" (Version 1.0), Published by Echelon Corporation, Palo Alto, California, 1999, 74 pages.

Michael R. Tennefoss, "Echelon White Paper: Implementing Open, Interoperable Building Control systems", Published by Echelon Corporation, Palo Alto, California, 2000, 14 pages.

American Microsystems, Inc., "A2SITM Advanced AS–Interface IC", Published by American Microsystems, Inc., Pocatello, Idaho, Mar. 2000, 27 pages.

DISTRIBUTED INTELLIGENCE CONTROL FOR COMMERCIAL REFRIGERATION

CROSS-REFERENCE TO RELATED APPLICATIONS

The subject matter of this patent is related to and comprises a continuation-in-part of PCT Application Ser. No. PCT/US01/08072, filed on Mar. 14, 2001, which is a continuation-in-part of U.S. patent application Ser. No. 09/524,939, filed on Mar. 14, 2000 now U.S. Pat. No. 6,332,327, both of which are owned by a common assignee.

BACKGROUND OF THE INVENTION

This invention relates generally to commercial refrigeration and more particularly to a commercial refrigeration system having unique power and communication wiring, as well as distribution of control intelligence features.

Great advances have been made over the last 50 years in all aspects of refrigerated food store merchandisers and coolers and the various commercial systems therefor. Retail food merchandising is conducted to a great degree in large supermarkets, each requiring substantial refrigeration capacity. For example, a 50,000 square foot (4,650 square meter) supermarket may have refrigerated display fixtures and other coolers and preparation rooms requiring an aggregate refrigeration capacity in excess of 80 tons (1,000,000 BTU/hr. or 242,000 kcal/hr.) which may include over 20 tons (60,500 kcal/hr.) of low temperature refrigeration at evaporator temperatures in the range of −35° F. to −5° F. (−37° C. to −21° C.) and over 60 tons (181,500 kcal/hr.) of normal temperature refrigeration at evaporator temperatures in the range of 15° F. to 40° F. (−9° C. to 4° C.). Such present commercial refrigeration systems have a multitude of evaporator cooling coils for the various refrigerated product merchandisers located throughout the supermarket; and these evaporators are typically cooled by several multiplexed low temperature and medium temperature compressor systems. It is also known to use such systems in smaller environments such as convenience stores, or for the preservation of other perishables not related to the food store environment (e.g., blood, plasma, medical supplies).

Conventional practice is to put the refrigeration requirements of a supermarket into two or more multiplexed refrigeration systems-one for the low temperature refrigeration fixtures for refrigerating fresh foods including meat, dairy and produce at product temperatures in the range of 28° F. to 50° F. (−2° C. to 10° C.). Each such system is a closed system branch having a single condenser/receiver and common discharge suction and liquid distribution headers with parallel circuits of the latter to the respective merchandiser or cooler evaporators and with the various complex valving requirements to balance suction pressures (EPR valves) and to accommodate selective evaporator isolation for gas or other types of defrosting. In any event, the multiplexed compressors of such systems are usually installed in back machine rooms and typically connect to roof top air-cooled condensers, which in turn connect back to the machine room to a receiver and thence to the liquid refrigerant distribution header and various high side valving and liquid line circuit outlets.

The multiplexed compressors in a refrigeration system are typically mounted together on a rack and piped in parallel, each having a low side connected to a suction header and a high side connected to the discharge header. The operation of the compressors is cycled, based on a measured system parameter, to maintain a desired level of refrigeration. Usually, the measured parameter is suction pressure at the suction header. A transducer on the suction header provides a signal to a compressor controller indicating the suction pressure, and the controller compares the measured pressure with a setpoint pressure and turns the compressors off and on accordingly, taking into consideration other factors such as compressor run time. It is also known to adjust system capacity in other ways, such as by changing the speed of an individual compressor motor where the design of the compressor permits. Refrigeration level can also be affected by cycling condenser fans and in other ways not directly pertaining to the compressors.

In addition to the controller, each compressor has a high voltage protection circuit capable of shutting down the compressor when it operates outside any one of a number of predetermined safe operating limits. A high voltage line in a shielded conduit must be brought from the store utility power distribution center to the compressor where the protection circuit is located. The protection circuit normally energizes a compressor control coil to close a compressor contact in series with the compressor power line so that the compressor may run when activated by a relay operated by the controller. Operating limits are typically established for one or more of: motor winding temperature, oil level (or pressure), discharge pressure and phase loss/reversal. The protection circuit has a safety contact wired in series for each operating limit. When a particular operating limit as detected by a corresponding sensor is exceeded, the contact opens causing the control circuit to open, de-energizing the compressor contactor coil and disabling energization of the compressor by the controller.

Existing protection circuits are aware only that the operating limit has been traversed, and have no capability to provide information as to the actual value of the parameter. A separate alarm circuit from the controller to the control circuit is needed so that notification of the problem can be made. In order to know which operating limit was traversed, still more indicator circuits are required between each safety contact and the controller. Thus, a substantial amount of wiring is necessary to connect the compressor to the controller. Even if the protection circuit is so wired for providing maximum information, there are substantial gaps in information concerning the operation of the compressor because of the absence of the ability to give an absolute reading of the parameter measured.

A parallel switchback circuit may be wired in parallel to the controller so that electro-mechanical control of the compressor can be activated in the event of controller failure. The parallel switchback circuit allows a suction pressure control switch to activate the compressor in the absence of a functioning controller. The switchback circuit provides only crude system control subsequent to controller failure. In order to have such a circuit it will be necessary to install isolation relays to prevent the possibility of control interference from the switchback circuit when the controller is operating normally.

In addition to the control wiring described above, power wiring is also necessary. The compressor is powered by a high voltage, three phase 480 V AC or 208 V AC line (or various other three phase power sources) and the control circuit is powered by a single phase 120 V AC or 208 V AC high voltage line. Two high voltage lines must be wired for each compressor; one three phase for the compressor motor and one single phase line for the protection circuit. These lines are required to be shielded, such as by placement in a conduit. Thus, a number of shielded power lines are required for each compressor rack, making existing wiring complex and costly.

Most of the sensors now used for monitoring safety and control parameters for the compressors are located outside of the compressor. Suction pressure monitoring is typically from the suction header, substantially remote from the compressors. Sensors associated with the safety module are located on the compressor. Thus, all of these items are exposed to potential damage during shipping and installation.

Further, it is also desirable to monitor and/or control other valving, switching circuits, and sensors associated with each refrigeration branch in a typical multiplexed system. For example, it is desirable to monitor actual fixture temperature to ensure that perishable products are being stored at an appropriate temperature to prevent spoilage. In prior art systems, however, a large amount of wiring is required to provide appropriate interfaces between the compressor rack and the various control valves, switches, and sensors in a given system. The wiring is a complex task and the source of frequent system malfunction, particularly for newly installed refrigeration systems. Such wiring requirements include power wiring, which requires additional shielding and protection techniques, including channeling the wiring through protective conduit.

Examples of the such valving, switching circuits, and sensors that have been used in prior art refrigeration systems may be found in several patents which are owned by the assignee of the present invention. For example, Thomas et al., U.S. Pat. No. 5,743,102, the entire disclosure of which is incorporated herein by reference, discloses a system having modular secondary refrigeration. Such system includes a cooling source remote from the refrigeration units that is constructed and arranged for circulating a fluid coolant in heat exchange relationship with the condenser to obtain optimum condensing and efficiency. FIG. 4 of the Thomas et al. patent discloses various valves and flow control mechanisms suitable for use in such a secondary refrigeration system. Schaeffer et al., U.S. Pat. No. 5,440,894, the entire disclosure of which is incorporated herein by reference, discloses a strategic modular commercial refrigeration system in which multiplexed compressors are placed in close proximity to one or more fixtures.

Shapiro, U.S. Pat. No. 6,067,482, the entire disclosure of which is incorporated herein by reference, discloses a load shifting control system for a commercial refrigeration system. As disclosed therein, a processor is configured to select a preferable combination of loads, and to generate control signals so as to achieve an allocation of loads between power sources. FIG. 3 of the Shapiro patent is illustrative of a commercial refrigeration system in accordance with a preferred embodiment of that invention.

Several other patents identify various structures, systems, and methods for defrosting a refrigeration system. Among such patents is Quick, U.S. Pat. No. 3,343,375, the entire disclosure of which is incorporated herein by reference, discloses a latent heat refrigeration defrosting system. In particular, the Quick patent discloses a system for defrosting evaporators using the latent heat of saturated compressed gasses. FIG. 1 of the Quick patent is exemplary of such a system. Further, Behr et al., U.S. Pat. No. 5,921,092, the entire disclosure of which is incorporated herein by reference, discloses a fluid defrost system and method that is suitable for use in secondary refrigeration systems, such at the system disclosed in the Thomas et al. patent, which is discussed above. FIGS. 1 and 2 of the Behr et al. patent are illustrative of aspects of that invention, including the control valves and switching associated with such a system.

Still other patents disclose various structures, systems, and methods related to controlling the oil used in a commercial refrigeration system. Included among these patents is DiCarlo et al., U.S. Pat. No. 4,478,050, the entire disclosure of which is incorporated herein by reference. The DiCarlo et al. patent discloses an oil separation system, including control means for maintaining a predetermined oil level in the compressor. FIG. 1 of the DiCarlo et al. patent is believed to be illustrative of a typical commercial refrigeration system embodying such a system, including the control valves and switches used in the system. A related patent by DiCarlo et al., U.S. Pat. No. 4,503,685, the entire disclosure of which is incorporated herein by reference, discloses an oil control valve, suitable for use in an oil separation and delivery system of a refrigeration system. Yet another related patent by DiCarlo et al., U.S. Pat. No. 4,506,523, the entire disclosure of which is incorporated herein by reference, discloses an oil separator unit, suitable for use in an oil separation and return system of a refrigeration system.

In view of the foregoing, there is a need for a commercial refrigeration system which reduces the need for power wiring between system components. There is a further need for such a system in which subsystem control is distributed among several modules, thereby reducing the risk of failure and the adverse consequences should a failure occur. There still a further need for a commercial refrigeration system that is at least partially self-configuring and is more easily installed and operated, as compared to prior art control systems.

SUMMARY OF THE INVENTION

Among the several objects and features of the present invention may be noted the provision of a commercial refrigeration system having distributed intelligence control functions; the provision of such a distributed intelligence control for a refrigeration system which can operate in case of main controller failure; the provision of such a refrigeration system control which is capable of continuously monitoring the status of operating parameters of multiplexed compressors; the provision of such a commercial refrigeration system control which provides substantial information about compressor operating characteristics; the provision of such a refrigeration system control which is easy to assemble and install; the provision of such a refrigeration system control which operates control functions at low voltage; and the provision of such a refrigeration system which has simplified wiring.

Further among the several objects and features of the present invention may be noted the provision of a compressor safety and control module for a commercial refrigeration system which is capable of communicating compressor status information; the provision of such a compressor safety and control module which is capable of monitoring its own compressor's operating parameters; the provision of such a compressor which shields sensors; the provision of such a compressor and compressor safety control module which provides highly accurate operating parameter data; the provision of such a compressor safety control module which can operate in cooperation with other compressor safety control modules if a master controller fails; the provision of such a compressor and compressor safety control module which is easy to wire into a refrigeration system.

Also among the objects and features of the present invention is the provision of a commercial refrigeration control system with increased system granularity. Such increase in granularity allows for closer matches of hardware to specific customer needs and requirements, with the need for little or no extemporaneous hardware. The provision of enhanced granularity also distributes the possibility of a failure over a wider hardware base, thereby limiting the severity of any potential adverse consequences to those functions contained within the failing device.

Further among the objects and features of the present invention is the provision of a commercial refrigeration control system that is easier to install and make operational than prior art systems. Such a system requires a minimum of power wiring and preferably allows subsystem components to receive power locally. Control is distributed over a low voltage communication channel so that high power signals are localized.

Generally, a commercial refrigeration system of the present invention suitable for use in a supermarket comprises an evaporator constructed and arranged to perform a cooling function. A compressor is in fluid communication with the evaporator for drawing refrigerant away from the evaporator. A condenser is in fluid communication with the compressor for receiving refrigerant from the compressor. The condenser is constructed and arranged for removing heat from the refrigerant. An expansion valve is in fluid communication with the condenser and receives refrigerant from the condenser. The expansion valve is constructed and arranged for delivering refrigerant into the evaporator. The system also includes a master controller. A compressor operating unit is associated with the compressor. The compressor operating unit is constructed and arranged for monitoring at least one operating parameter of the compressor and for determining whether the operating parameter is within specification. A first power and communication line extends from the master controller to the compressor operating unit and provides electrical power for the compressor operating unit. The master controller and compressor operating unit are constructed and arranged for digital communication over the power and communication line such that no separate power line for the operating unit must be wired upon installation of the system. A condenser fan is associated with the condenser and provides air cooling to remove heat from the refrigerant. A condenser controller is in digital communication with the master controller. The condenser controller is capable of providing a fan control signal. The condenser controller is constructed and arranged for monitoring at least one operating parameter of the condenser. A fan control unit associated with the condenser fan controls an operation of the condenser fan in response to the fan control signal. A second power and communication line extends from the condenser controller to the fan control unit and provides electrical power for the fan control unit. The system aslo includes an electronically controlled valve. A valve controller is in digital communication with the master controller. The valve controller is constructed and arranged for providing a valve control signal to the electronically controlled valve to position the electronically controlled valve at a desired setting in response to a valve control signal from the master controller. At least one branch control switch is constructed and arranged for controlling a flow of refrigerant. A branch controller is in digital communication with the master controller. The branch controller is constructed and arranged for providing at least one branch control signal to the at least one branch control switch in response to a branch control command from the master controller.

In another aspect, the present invention comprises a commercial refrigeration system suitable for use in a supermarket. The system includes an evaporator having a refrigerant selectively flowing therethrough to cool the evaporator. A compressor is in fluid communication with the evaporator and draws refrigerant away from the evaporator. A master controller selectively supplies a branch control signal. A power and communication line extends from the master controller. The system also includes a refrigeration branch comprising the evaporator, a refrigeration line for supplying the refrigerant to the evaporator, and a branch controller for controlling an operation of the refrigeration branch in response to the branch control signal. The master controller and branch controller are constructed and arranged for digital communication over the power and communication line such that no separate power line for the branch controller must be wired upon installation of the system.

In yet another aspect, the invention comprises a commercial refrigeration system suitable for use in a supermarket. The system includes an evaporator having a refrigerant selectively flowing therethrough for cooling the evaporator. A refrigeration line supplies the refrigerant to the evaporator. The evaporator and refrigeration line comprise a refrigeration branch. A compressor is in fluid communication with the evaporator. The compressor draws refrigerant away from the evaporator. A master controller selectively supplies a branch set point signal having a parameter representative of a desired characteristic of the refrigeration branch. A communication line extends from the master controller. A subsystem controller is in digital communication with the master controller over the communication line. The subsystem controller receives the branch set point signal and determines a branch control action in response thereto.

A further aspect of the invention comprises a commercial refrigeration system suitable for use in a supermarket. The system includes an electronically controlled valve. A master controller selectively supplies a valve control signal having a parameter representative of a desired position of the electronically controlled valve. A valve controller is responsive to the valve control signal and selectively supplies a valve drive signal to the electronically controlled valve. A communication channel extends from the master controller to the valve controller. The master controller supplies the valve control signal to the valve controller over the communication channel. The master controller and the valve controller are constructed and arranged such that no separate power line must be wired from the master controller to the valve controller upon installation of the system.

In yet another form, the invention comprises a commercial refrigeration system suitable for use in a supermarket. The system includes an electronically controlled valve having a plurality of valve positions. A master controller selectively supplies a set point signal having a parameter representative of a desired operating condition of the refrigeration system. A communication channel extends from the master controller. A valve controller is in digital communication with the master controller over the communication channel. The valve controller receives the set point signal over the communication channel and determines a valve drive signal as a function of the set point signal. The valve controller supplies the determined valve drive signal to the electronically controlled valve such that the desired refrigeration system operating condition is substantially achieved.

The invention further comprises a commercial refrigeration system suitable for use in a supermarket. Such a system includes at least one fixture. An evaporator is constructed and arranged for cooling the at least one fixture. A refrigerant supply line supplies a pressurized refrigerant to the evaporator. A master controller selectively supplies a fixture control signal having a parameter indicative of a desired fixture control action for the at least one fixture. At least one fixture sensor is associated with the at least one fixture. The at least one fixture sensor is constructed and arranged to provide a fixture status signal having a parameter representative of an operating condition associated with the at least one fixture. A communication channel extends from the master controller. A fixture controller is in digital communication with the master controller over the communication channel such that no separate power line must be wired from the master controller to the fixture controller upon installation of the system. The fixture controller receives the fixture control signal over the communication channel. The fixture controller is constructed and arranged for receiving the fixture status signal from the at least one fixture sensor and for supplying the fixture status signal to the master controller over the communication channel.

Yet another aspect of the present invention comprises a commercial refrigeration system suitable for use in a supermarket. The system includes at least one fixture. An evaporator is constructed and arranged for cooling the at least one fixture. A refrigerant supply line supplies a pressurized refrigerant to the evaporator. The system also includes a master controller and a fixture controller. At least one fixture sensor is associated with the at least one fixture. The at least one fixture sensor is constructed and arranged to provide a fixture status signal to the fixture controller. The fixture status signal has a parameter representative of an actual operating condition associated with the at least one fixture. A communication channel extends from the master controller to the fixture controller. The master controller selectively supplies a fixture set point signal to the fixture controller over the communication channel. The fixture set point signal has a parameter indicative of a desired operating set point for the at least one fixture. The fixture controller is responsive to the fixture set point signal for determining a fixture control action.

A further aspect of the present invention involves a commercial refrigeration system suitable for use in a supermarket. The system includes at least one fixture. An evaporator is constructed and arranged for cooling the at least one fixture. A refrigerant supply line supplies a pressurized refrigerant to the evaporator. The system also includes a master controller. At least one fixture sensor is associated with the at least one fixture. The at least one fixture sensor is constructed and arranged to provide a fixture status signal having a parameter representative of an operating condition associated with the at least one fixture. A communication channel extends from the master controller. A fixture controller is in digital communication with the master controller over the communication channel such that no separate power line must be wired from the master controller to the fixture controller upon installation of the system. The fixture controller is constructed and arranged for receiving the fixture status signal from the at least one fixture sensor and for supplying the fixture status signal to the master controller over the communication channel.

Yet another aspect of the present invention comprises a commercial refrigeration system suitable for use in a supermarket. The system comprises at least one fixture. An evaporator is constructed and arranged for cooling the at least one fixture. A refrigerant supply line supplies a pressurized refrigerant to the evaporator. The system also includes a master controller. A plurality fixture sensors are associated with the at least one fixture. The plurality of fixture sensors are constructed and arranged to provide a plurality of fixture status signals, with each of said plurality of fixture status signals having a parameter representative of an operating condition associated with the at least one fixture. A first communication channel extends from the master controller. A fixture controller is in digital communication with the master controller over the communication channel such that no separate power line must be wired from the master controller to the fixture controller upon installation of the system. A second communication channel extends from the plurality of fixture sensors to the fixture controller. The fixture controller being constructed and arranged for receiving the plurality of fixture status signals from the plurality of fixture sensors over the second communication channel and supplying the plurality of fixture status signals to the master controller over the first communication channel.

A further aspect of the present invention involves a method of installing a commercial refrigeration control system including a refrigeration subsystem, and a master controller providing a refrigeration set point control command to a subsystem controller controlling the refrigeration subsystem. The method comprises installing the master controller at a first location. The subsystem controller is installed at a second location. A source of electrical power is supplied to the master controller. A power and communication line is installed between the master controller and the subsystem controller whereby the refrigeration set point control command is provided over the power and communication line and no separate power line for the subsystem controller must be wired upon installation of the commercial refrigeration system.

Still another aspect of the present invention involves a method of installing a commercial refrigeration control system including a refrigeration subsystem, and a master controller providing a refrigeration set point control command to a subsystem controller controlling the refrigeration subsystem. The method includes installing the master controller at a first location. The subsystem controller is installed at a second location. A source of electrical power is supplied to the master controller. A communication channel is installed between the master controller and the subsystem controller. The master controller and said subsystem controller are constructed and arranged for digital communication over the communication channel such that the refrigeration set point control command is provided over the communication channel and no separate power wiring must be wired from the master controller to the subsystem controller upon installation of the commercial refrigeration system.

A further aspect of the present invention involves a commercial refrigeration system suitable for use in a supermarket. The system includes an evaporator constructed and arranged to perform a cooling function. A compressor is in fluid communication with the evaporator for drawing refrigerant vapor from the evaporator. A condenser is in fluid communication with the compressor for receiving refrigerant from the compressor. The condenser is constructed and arranged for removing heat to condense the refrigerant. An expansion valve is in fluid communication with the condenser for receiving liquid refrigerant from the condenser. The expansion valve is constructed and arranged for delivering refrigerant into the evaporator. A controller controls the compressor. A compressor operating unit is associated with the compressor. The operating unit is constructed and arranged for monitoring at least one operating parameter of the compressor and for determining whether the operating parameter is within specification. A power and communication line extends from the controller to the compressor operating unit and provides electrical power for the operating unit. The controller and compressor operating unit are constructed and arranged for digital communication over the power and communication line such that no separate power line for the operating unit must be wired upon installation of the system. The system also comprises a fixture for holding food. A secondary cooling loop is constructed and arranged for cooling the food in the fixture. The evaporator is in heat exchange relationship with the secondary cooling loop for removing heat therefrom.

Still another aspect of the present invention involves a method of controlling a commercial refrigeration system. The commercial refrigeration system comprises a master controller selectively supplying a master control signal, at least one subsystem controller selectively supplying a subsystem control signal, a communication channel extending between the master controller and the subsystem controller, and a controlled subsystem including a switching device having at least two operating states. The switching device is constructed and arranged to receive the subsystem control signal. The method comprises supplying the master control signal from the master controller to the at least one subsystem controller over the communication channel. The master control signal is received at the subsystem controller. The subsystem controller determines which one of the at least two operating states of the switching device corresponds to the master control signal. The subsystem controller outputs the subsystem control signal in a form that drives the switching device to the desired one of the at least two operating states whereby no separate communication channel exists between the master controller and the switching device.

These and still other objects and features of the present invention will become more apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENT

Figure 1:
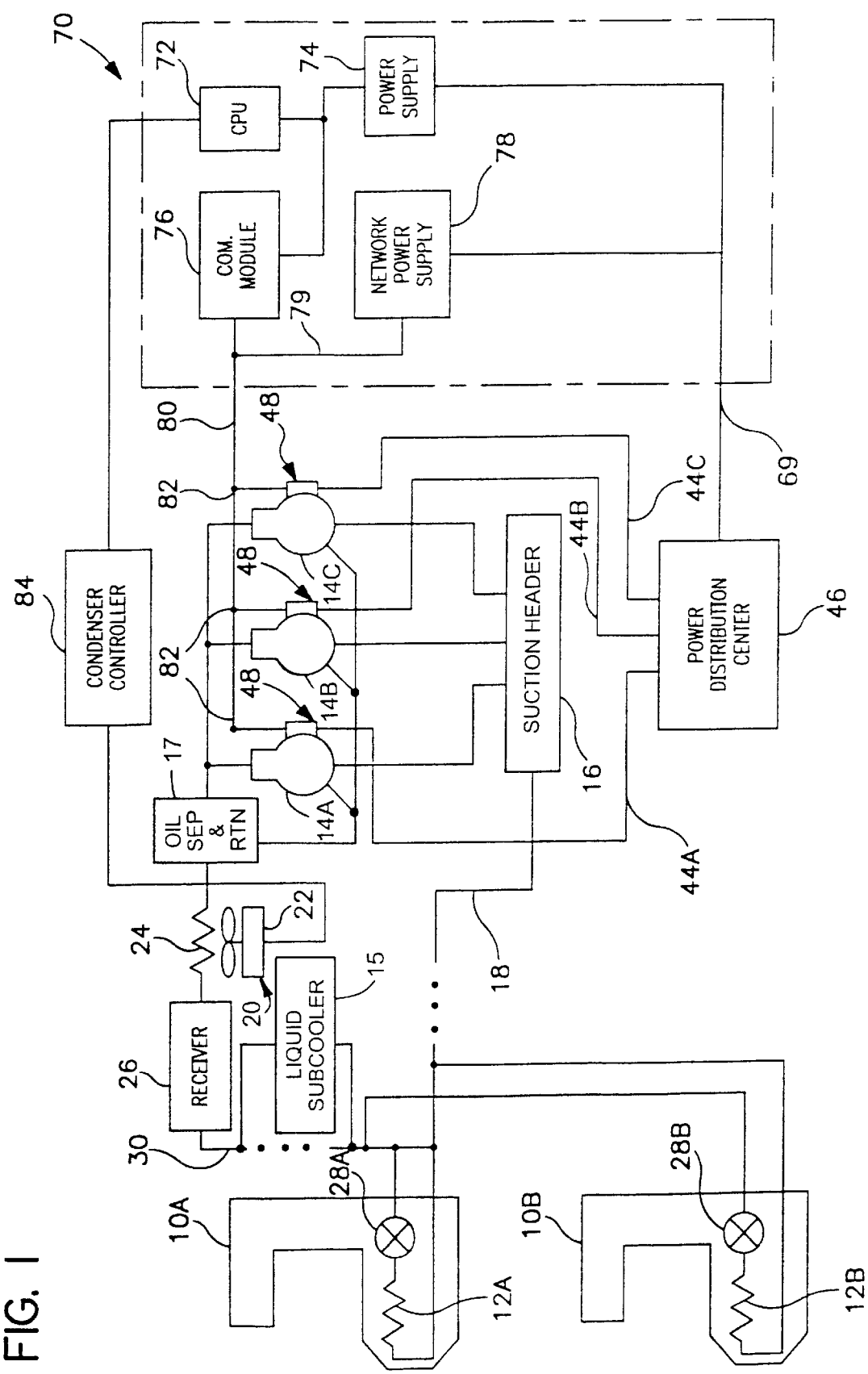
FIG. 1 is a schematic representation of a refrigeration system of the present invention in a food store.

Referring now to FIG. 1, a commercial refrigeration system for use in a food store is shown to comprise one or more fixtures which are illustrated as food display merchandisers 10A, 10B in the shopping arena of a food store. The merchandisers 10A, 10B each incorporate at least one evaporator coil 12A, 12B (or like heat exchanger unit) disposed for cooling the merchandiser. Three multiplexed compressors (designated 14A, 14B, 14C, respectively) are connected by way of a suction header 16 and a low side return pipe 18 in fluid communication with the low side of the evaporators 12A, 12B for drawing refrigerant away from the evaporators. A condenser (generally indicated at 20) including a fan 22 and heat exchanger 24 is in fluid communication on the high discharge side of the compressors 14A, 14B, 14C for removing heat and condensing refrigerant pressurized by the compressors. Although an air-cooled condenser 20 is shown, other types of condensers, such as those liquid cooled from a ground source water supply, may be used without departing from the scope of the present invention. Moreover, it is to be understood that the single illustrated fan 22 represents one or more fans typically used in a condenser for commercial refrigeration applications.

Refrigerant from the condenser 20 is conventionally stored in a receiver 26 in communication with expansion valves 28A, 28B by way of a high side liquid delivery line 30. The expansion valves 28A, 28B meter refrigerant into respective evaporators 12A, 12B and induce a pressure drop for absorbing heat, to complete the refrigeration circuit. The compressors 14A, 14B, 14C and usually also the suction header 16 and receiver 26 are mounted on a compressor (i.e., condensing unit) rack (not shown) prior to shipment to the store location where the refrigeration system is to be installed.

The food display merchandisers 10A, 10B illustrated with the evaporators 12A, 12B would be placed in the shopping arena of a food store. However, it is understood that other types of cooling fixtures could be placed in other parts of the store (e.g., a service area or back room cooler). The liquid line 30 and suction return line 18 have been broken to indicate connection to other evaporators (not shown) in the system. Evaporators may be connected to the same piping circuit between the receiver 26 and the suction header 16, or in a different circuit or "branch" (not shown) connected to the receiver. Further, the number of compressors 14 in the refrigeration system may be more or less than three (including only a single compressor) without departing from the scope of the present invention. The refrigeration system must include a compressor, a condenser, an expansion valve and an evaporator. Other components are preferably included but are not essential, and the precise mounting or location of the system components may be other than described without departing from the scope of the present invention. Moreover, the present invention has application outside the food store environment for cooling other perishable, non-food products such as blood, plasma and medical supplies.

Figure 3:
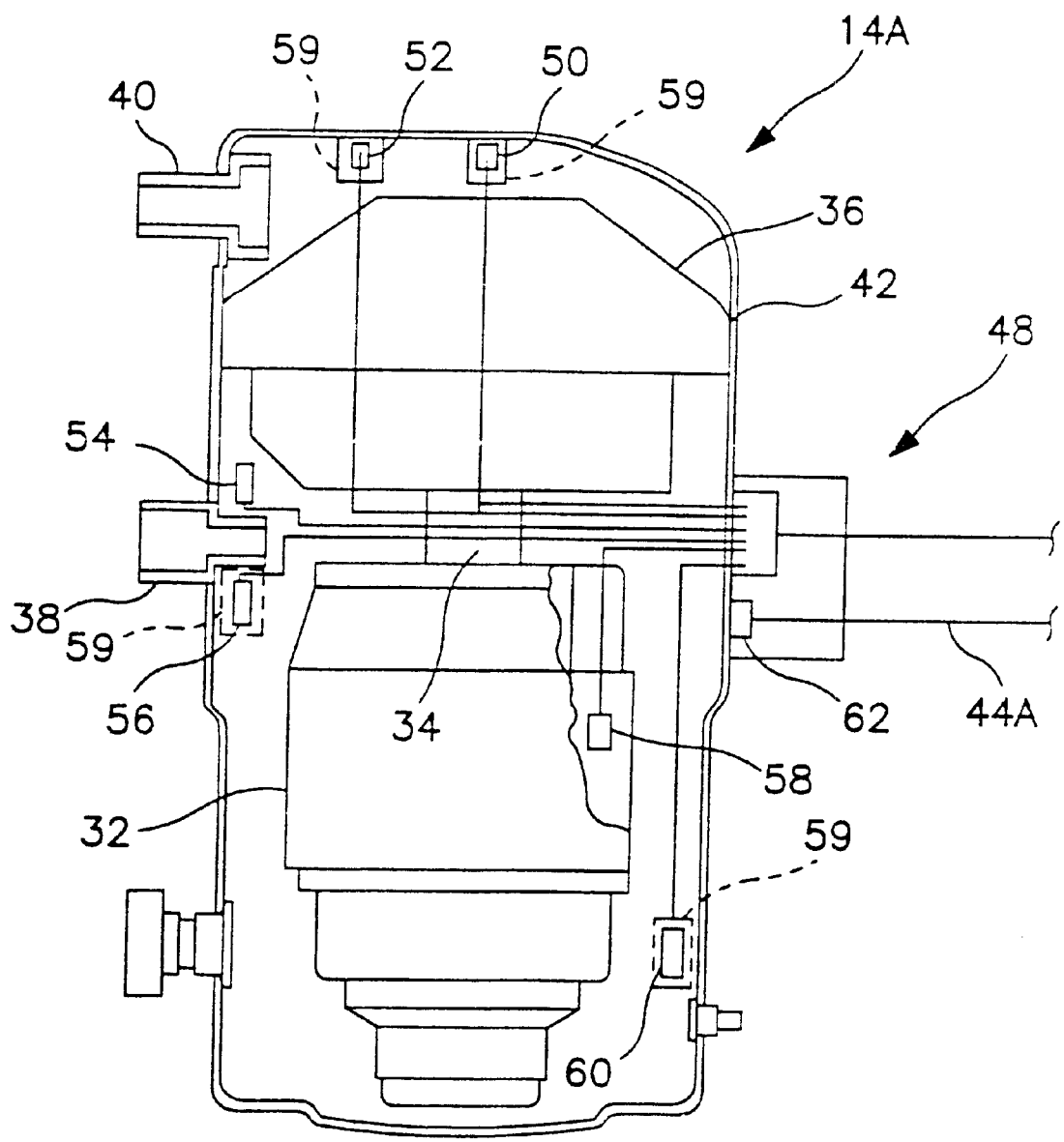
FIG. 3 is a schematic representation of a compressor of the present invention.

As shown in FIG. 3, each compressor 14A, 14B, 14C comprises an electric motor 32 driving a shaft 34 connected to a pressurizing unit 36. For purposes of the description herein, compressor 14A will be referred to, the other compressors 14B, 14C preferably having the same construction. The pressurizing unit may take on any suitable form. Typically, reciprocating pistons driven by a motor constitute the pressurizing device, but more and more, the quieter rotary devices found in scroll compressors and screw compressors are being employed to compress the vaporous refrigerant. A scroll compressor is illustrated in FIG. 3. The compressor 14A has a low side suction inlet 38 which receives the vaporous refrigerant from the evaporators 12A, 12B and a high side discharge outlet 40 through which hot, pressurized refrigerant is discharged from the compressor. The motor 32 and pressurizing unit 36 are preferably semi-hermetically or hermetically sealed within an outer casing or shell 42. The motors 32 of the compressors (FIG. 1) are each connected to a respective high voltage (e.g., three phase 480 V AC or 208 V AC) power line 44A, 44B, 44C extending from a power distribution center 46 within the food store. These lines are shielded, such as by placement within a conduit, as is required by electrical codes.

The compressors 14A, 14B, 14C each have a bus compatible compressor safety and control module 48 (broadly, "compressor operating unit") for monitoring at least one, but preferably several operating conditions or parameters of the compressor. The "operating parameters" in the preferred embodiment include (1) control parameters providing information used for controlling activation of the compressor 14, and (2) safety parameters providing information about whether the compressor is operating within its designed operational envelope or in a manner which could damage the compressor. It is envisioned that any number of parameters could be monitored, including only safety parameters or, less likely, only control parameters. Control parameters may include suction temperature, suction pressure and discharge pressure. Safety parameters usually include at least discharge pressure, oil level (or pressure), phase loss/reversal and motor winding temperature. However, the safety parameters preferably also include discharge temperature. As is apparent, some of the control parameters are also classified as safety parameters.

The bus compatible compressor safety and control module 48 (hereinafter, "BCCSCM") is constructed and arranged to detect the various operating parameters and control operation of the compressor. In the preferred embodiment, the BCCSCM comprises a processor 49 and multiple sensors in electronic communication with the processor. In the illustrated embodiment (FIG. 3), the compressor 14A is built with individual continuous reading analog sensors including a discharge pressure sensor 50, a discharge temperature sensor 52, a suction pressure sensor 54, a suction temperature sensor 56 and a motor winding temperature sensor 58 (FIG. 3). The temperature sensors 52, 56, 58 are variable resistance, RTD-type sensors. An oil level sensor 60 is of the type which changes the state of a circuit when the oil level falls below a predetermined minimum, and does not provide a continuous reading of the oil level. A power phase monitoring device 62 incorporated into the BCCSCM is capable of detecting both phase loss and phase reversal on the three phase power line 44A coming into the compressor 14A. It is to be understood that other sensors may be used without departing from the scope of the present invention.

An important feature of this invention is that the sensors 50–62 are preferably installed at the compressor assembly site and disposed within the hermetically (or semi-hermetically) sealed shell 42 of the compressor (FIG. 3). This construction is preferred because the sensors are protected in the shell and, particularly in the case of the suction pressure sensor 54, are located close to the pressurizing unit 36 for more accurate readings of compressor function. However, it is to be understood that the sensors 50–62 could be located other than in the shell 42 without departing from the scope of the present invention. For instance, it is envisioned that sensors could be replaceably received in openings in the shell 59 (schematically illustrated in phantom in FIG. 3) accessible from the exterior, or external to the compressor shell as in the case of a reciprocating semi-hermetic compressor, or any other motor driven compression device.

Figure 2:
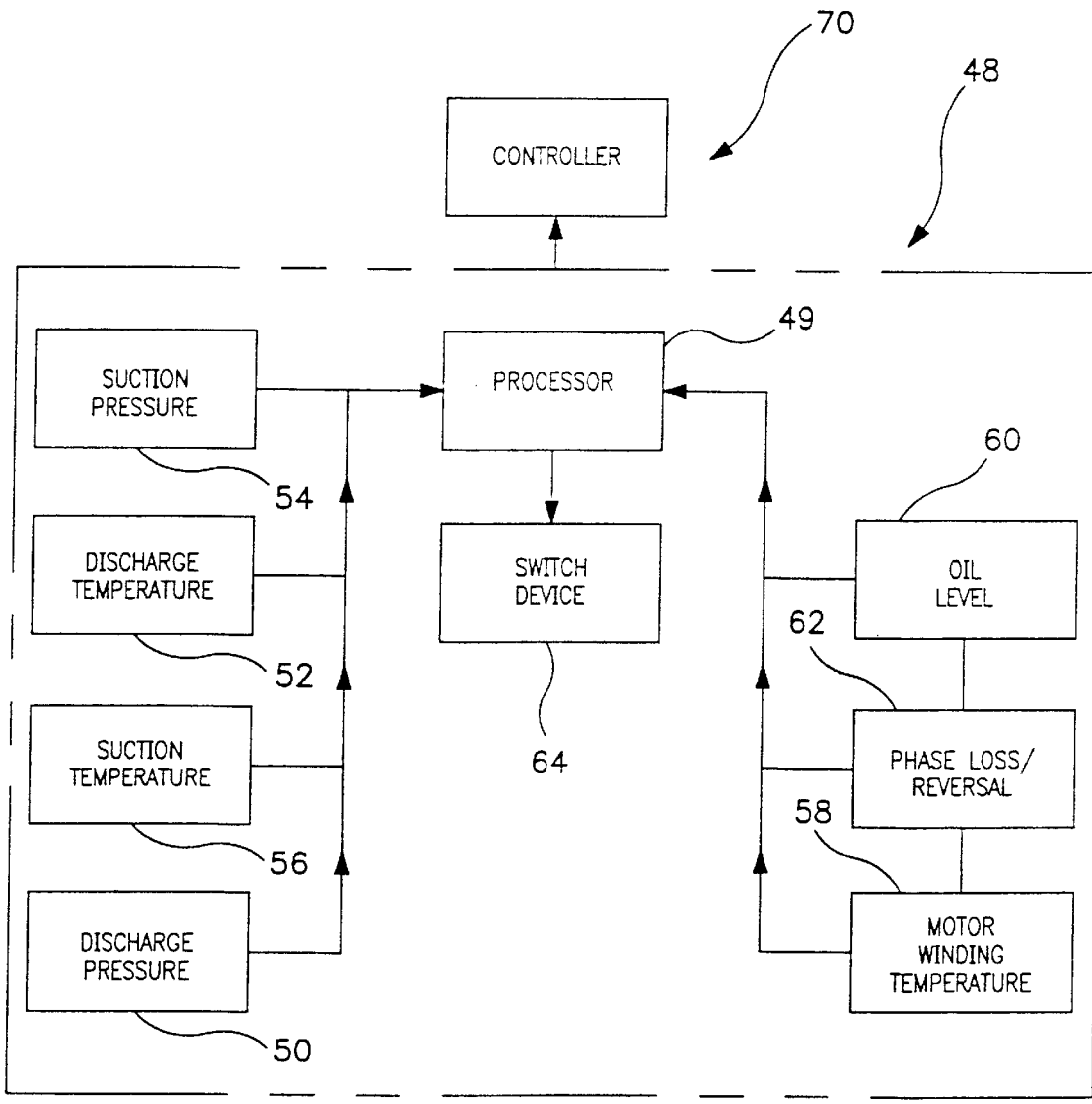
FIG. 2 is a schematic representation of a bus compatible compressor safety and control module of the present invention.

The processor 49 of the BCCSCM 48 in the preferred embodiment is a dual processor system, including a host microcontroller and a communication slave processor. The microcontroller and communications slave are not separately represented in FIG. 2, but are collectively represented as the processor 49. The host microcontroller preferably has a 256 byte internal RAM, 8 kilobytes of flash program memory, and 16 input/output pins for control interface. The communication slave, preferably, is an application specific integrated circuit (ASIC) for the field bus network described below (AS-Interface®). The communication slave translates the protocol of the field network into a signal understood by the host microcontroller, and vice versa. For example, if the field bus network provides four data bits per message, the communication slave may be configured to extend the data capabilities of the field bus network by interfacing with an intermediate memory device between the communication slave and the host microcontroller. Preferably, this intermediate device comprises an additional RAM. In such an embodiment, the communication slave and the host microcontroller interface with the RAM to extend the data capabilities of the field bus network by using sequential read or write cycles of the field bus network to build larger data sizes. In other words, rather than limiting the data sizes to four bits, larger data sizes are constructed by grouping multiple four-bit data transmissions. The communication slave sequentially writes the data into (or reads the data from) the additional RAM. The host microcontroller reads the data from or writes the data to the additional RAM. Thus, for example, a sixteen bit data parameter may be constructed over the course four successive data cycles.

Alternative structures can also be employed in this regard. For example, separate microprocessor, RAM, and program memory devices could replace the microcontroller, and the additional RAM device could be eliminated. Similarly, a field bus protocol having larger inherent data sizes could be accommodated without departing from the scope of the present invention, thereby potentially eliminating the need for a communication slave to translate the protocol.

The microcontroller is adapted to receive a signal from the sensor indicative of the value of the measured operating parameter at the time a reading is taken. The microcontroller also stores safety limit values for the measured safety parameters. The microcontroller is capable of generating a digital status information signal indicative of the values of the operating parameters. When a safety limit is traversed, the microcontroller is capable of generating a digital status information signal including specific information as to which safety parameter is out of specification. These signals are translated by the communication slave for sending over the field bus network.

The BCCSCM 48 for each compressor further includes a switch device 64, which is preferably a three pole solid state relay such as SSRD Series panel mount heavy duty solid state AC relay. The SSRD Series is made by Teledyne, Inc. of Los Angeles, Calif. and available from Allied Electronics of O'Fallon, Mo. The relay operates, upon receiving a command from the processor 49, to block two of the three phases of the electrical power to the compressor motor 32, thereby turning the motor off. It is to be understood that other switch devices may be used without departing from the scope of the present invention. The processor 49 is programmed to cause the relays to turn off the compressor (14A) when a safety limit value of one of the safety parameters is traversed.

In another embodiment, the SSRD is constructed to include an overcurrent protection capability. A current sensor (not shown) associated with the switch device 64 monitors the current through the SSRD. If the sensed current exceeds a threshold (e.g., 350A for 1.5 line cycles), the SSRD is shut off (rendered non-conducting) to protect the compressor motor 32. Such an overcurrent condition can occur, for example, if the rotor of the compressor motor 32 locks. Thus, a current sensor associated with the SSRD serves as a locked rotor detector. The sensed current information may also be used to detect other compressor abnormalities. Moreover, a current sensor that is a self-contained part of the compressor controlling device provides additional advantages. For example, current information is available on the system control bus via the BCCSCM 48 for use in safety and control applications, and the value of current information is not limited to energy management/monitoring functions.

The current sensor may be constructed internal to the SSRD, or it may be a sensor external to the SSRD. For example, a current sensing toroid could be used external to the SSRD to sense current. Alternatively, a high power, current sensing resistor may be included within the SSRD to sense current.

Figure 6:
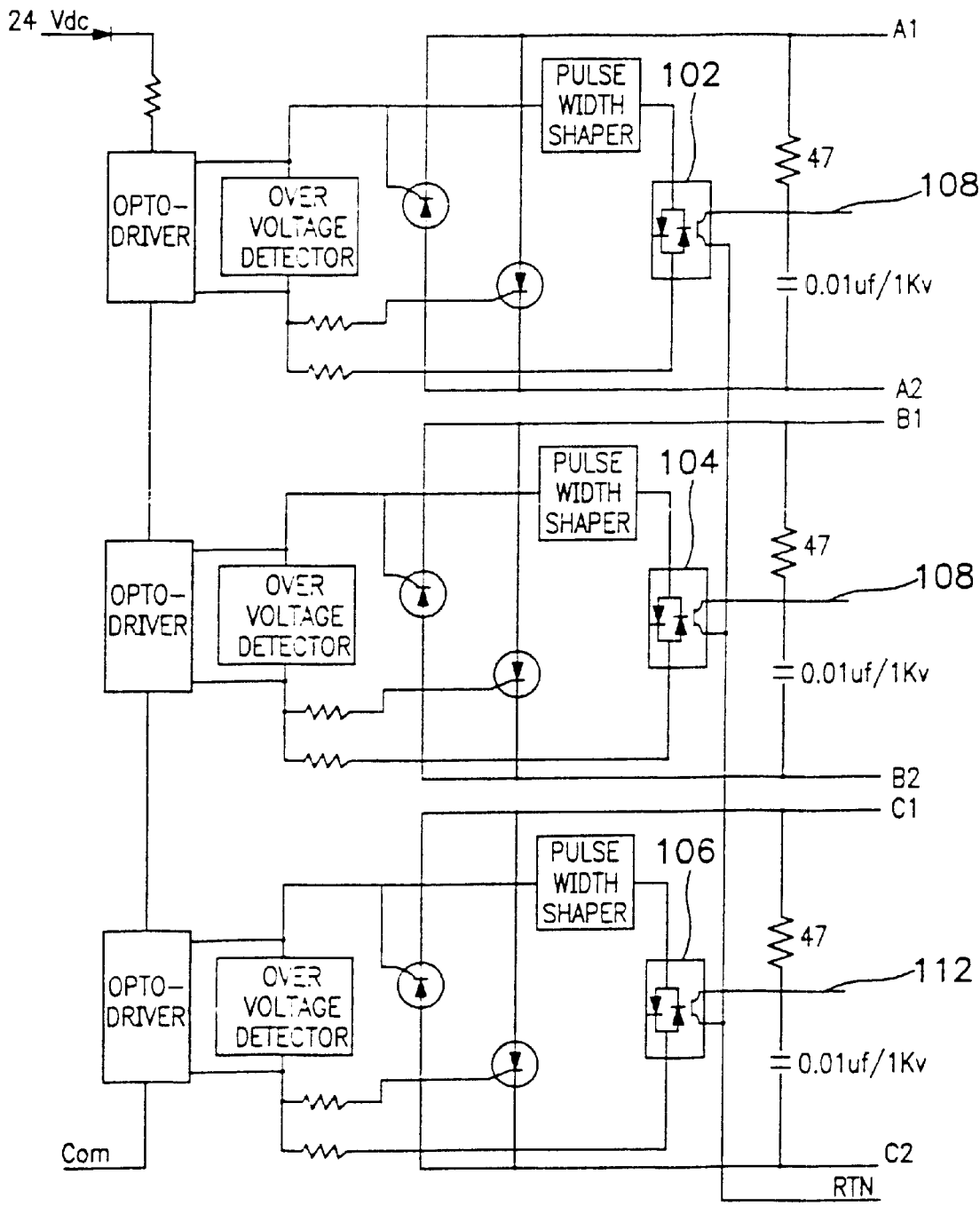
FIG. 6 is a schematic representation of aspects of a solid state relay device for use in connection with the present invention.

FIG. 6 is a schematic representation of another aspect of a preferred SSRD. A typical commercial refrigeration compressor system uses three-phase electrical power. Thus, by controlling the SSRD, the application of phases A, B, and C of such a three-phase power system is also controlled.

As illustrated in FIG. 6, the SSRD preferably includes three opto-isolators 102, 104, 106 that are constructed as an integral component of the overall SSRD assembly. Opto-isolator 102 is associated with phase A. Opto-isolator 104 is associated with phase B. Opto-isolator 106 is associated with phase C. The opto-isolators detect the zero-crossing of the respective phases with which they are associated. Thus, when phase A crosses zero, opto-isolator 102 produces an output, via its collector, on line 108. Likewise, when phase B crosses zero, opto-isolator 104 produces an output on line 110. Similarly, when phase C crosses zero, opto-isolator 106 produces an output on line 112. As one skilled in the art can now appreciate from the foregoing, such zero-crossing information amounts to phase reference information, which may be compared to determine the relationship between the power phases.

As those skilled in the art will also appreciate, if power is applied to the compressor motor 32 when an improper phase relationship exists, the compressor motor may be damaged or destroyed. For example, if a scroll compressor (not shown) is run backwards, for even an instant, because of an improper phase relationship, the compressor may be seriously damaged or ruined. Advantageously, the zero-crossing detection capability of the present invention is integral to the SSRD and available when the SSRD is open-circuited—when it is non-conducting and no power is applied to the compressor motor 32. Hence, the BCCSCM 48 can monitor the phases for a proper polarity relationship before applying power to the compressor motor 32. Stated differently, the BCCSCM 48 can determine the presence of an improper phase relationship by comparing the phase information to an acceptability standard and prevent potential damage to the compressor motor 32 that would otherwise occur if power were applied to the motor. In contrast, prior art phase polarity detection schemes rely on devices external to the SSRD. More importantly, such prior art schemes do not detect an improper phase relationship before applying power. Rather, such systems check the phase relationship only after power application. In such systems, if an improper phase relationship is detected, power is removed. As those skilled in the art can appreciate, the compressor motor 32 may be damaged or destroyed before power is removed, even if it is removed relatively rapidly. Thus, the SSRD, as shown in FIG. 6 provides an important improvement over the prior art because it provides for phase detection prior to the application of power.

A master controller 70 for controlling all of the compressors 14A, 14B, 14C of the refrigeration system is in electronic communication with all of the BCCSCM's 48 of the refrigeration system via line 80. The controller includes a CPU 72 which coordinates data transfer among the components of the system. The CPU 72 also processes data acquired from the BCCSCM's 48 and determines control commands to be sent to the BCCSCM's. In the preferred embodiment, the CPU 72 includes a 16 bit RISC processor, has 64 kilobytes of read only memory (ROM) and 16 kilobytes of random access memory (RAM). A real time clock is needed for the CPU 72 to perform time-based control functions. Moreover, the CPU 72 preferably has at least two serial interfaces to permit connection to a local human-machine interface (hereinafter, "HMI"), as well as a remote interface. The local and remote interfaces may also be referred to as input/output devices. The CPU 72 has both digital and analog inputs and outputs, and is powered by a 24 V DC power supply 74 transformed and rectified from a 120 V AC feed line 69.

The controller 70 further includes a communications module 76 (COM. MODULE) to permit the CPU 72 to work with a field bus networking system. The field bus networking system is designed to connect sensors, actuators and other control equipment at the field level. An example of a suitable field bus networking system is the AS-Interface® (or AS-i) networking system. Components for the AS-i network are sold commercially by Siemens Aktiengesellschaft of Germany, and available in the United States from Siemens Energy Automation and Control, Inc. of Batavia, Ill. The communications module 76 is powered by the same 24 V power supply 74 used by the CPU 72. However, the field bus network operates on a separate 24 V-30 V DC power supply 78 (NETWORK POWER SUPPLY) connected to a 120 V AC feed line 69. The field bus network further includes an unshielded two wire bus 80 connecting the communications module 76 (and hence the CPU 72) to all of the BCCSCM's. One wire is a ground wire and the other is a communication and power line which carries all communication and power for the BCCSCM's 48. Power for the BCCSCM's is supplied from the network power supply 78 through line 79, which has a communications decoupling feature allowing communications and power to be supplied over the same line. The BCCSCM's 48 are each connected to the bus 80 at nodes 82 by a respective coupling (not shown) which penetrates insulation of the bus cable and makes contact with the wires. Each BCCSCM 48 is plugged into the coupling to connect the control and safety module to the network.

The master controller 70 also controls cycling of the condenser fans 22. For example, the master controller 70 may monitor discharge pressure and liquid refrigerant temperature to determine when to cycle the condenser fans 22. Similarly, the master controller 70 may monitor discharge pressure and outdoor ambient temperature to determine whether to split the condenser. In the illustrated embodiment, the master controller 70 transmits these cycling commands from the CPU 72 to a separate condenser controller 84 located close to the fans 22. The condenser controller 84 executes the commands for shutting down or energizing the condenser fans 22. Because the condenser is typically located remotely from the compressor rack, in many configurations it will be undesirable or impractical to locate the condenser controller 84 on the same field network bus (e.g., AS-i bus) as the CPU 72. FIG. 1 illustrates such a situation, in which the condenser controller preferably has its own field bus network (e.g., another AS-i bus) for controlling a Bus Compatible Fan Control Module (BCFCM) (not shown) that controls the condenser fans 22. In other words, the condenser controller 84 can have its own field bus network for controlling the condenser fans, just like the network of the compressors 14A, 14B, 14C with the master controller 70.

For example, the CPU 72 may communicate with the condenser controller 84 over a relatively longer distance network. The Multipoint Interface or "MPI", available from Siemens, is an example os such a longer distance network/field bus. Another example is the ProfiBUS standard. In this way, the condenser controller 84 acts as a gateway to extend the range of the master controller 70 in a situation in which the primary field bus network associated with the compressor rack (e.g., AS-i bus) could not practically be used. Thus, the master controller 70 provides operating and control functions to the condenser controller 84. The condenser controller 84, via its own field bus network, supplies the control information to the BCFCM which drives the fans 22. Likewise, data available at the condenser (e.g., an ambient air temperature associated with the condenser and information regarding which fan(s) is/are on) may be transmitted to the master controller 70. In a preferred embodiment, an air temperature sensor (not shown) provides ambient air temperature data directly to the condenser controller 84 (i.e., independently of any field bus network), which transmits such data to the master controller 70.

Advantageously, if the master controller 70 ceases communications with the condenser controller 84, the condenser controller is preferably programmed to independently determine and provide at least some of the control information required to drive the fans 22 via the BCFCM.

Other condenser control arrangements may be used without departing from the scope of the present invention. For instance, the condenser controller 84 could be eliminated and its functions programmed into the master controller.

Figure 4:
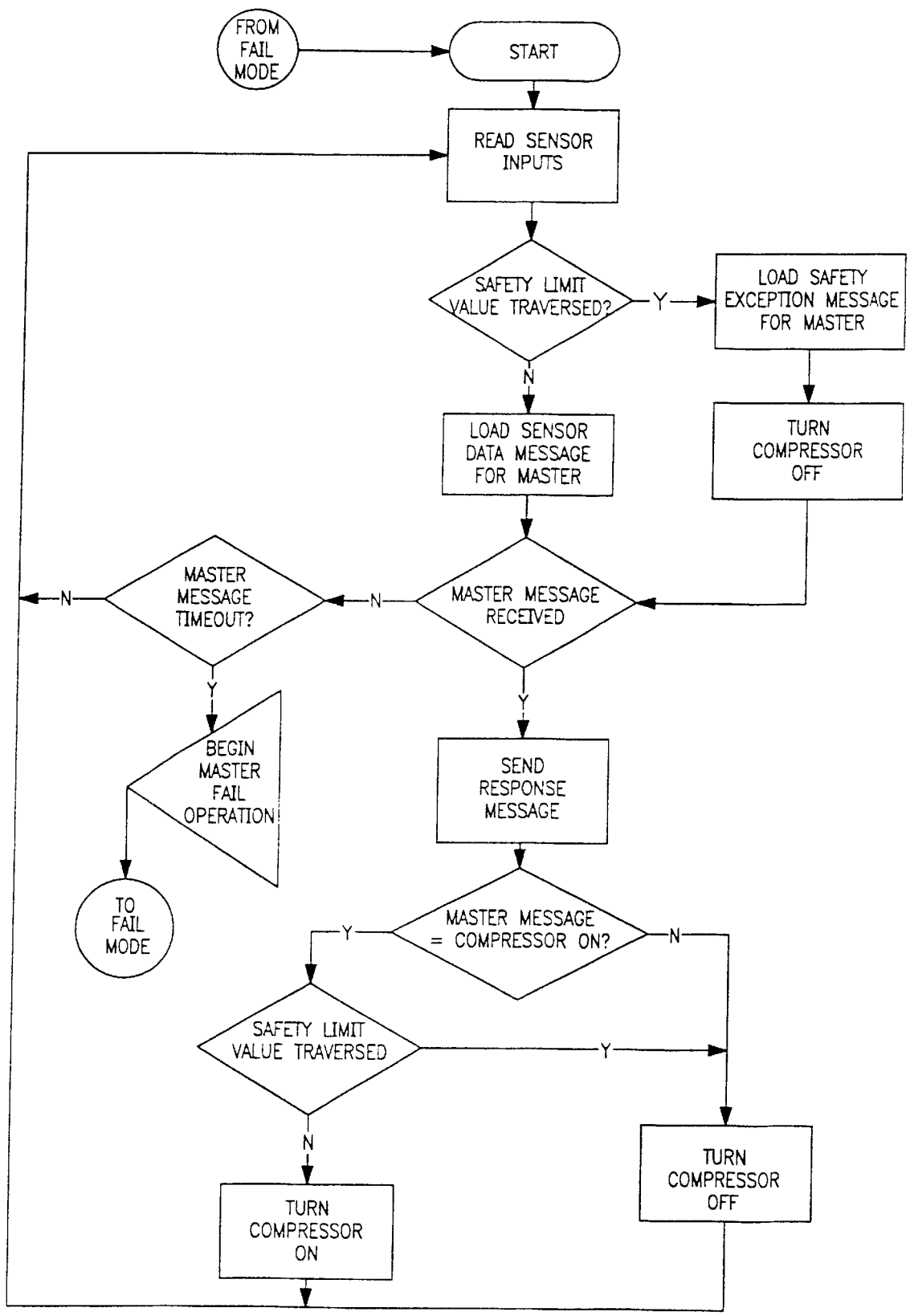
FIG. 4 is a flow diagram illustrating operation of the control and safety module in a standard operating mode.

Referring now to FIG. 4, in standard operation, the sensors 50–62 of each BCCSCM 48 (e.g., the BCCSCM associated with compressor 14A) provide information regarding the operating parameters monitored by the sensors and these are read in a first operation of the BCCSCM processor 49. The information provided by the sensors 50–62 could be limited to whether or not a pre-set safety limit value has been traversed. However, preferably at least some of the sensors would provide signals to the processor 49 of each BCCSCM 48 indicative of the actual value of the operating parameter at the time sampled. In a preferred embodiment, the sensors for discharge pressure (50) and temperature (52), suction pressure (54) and temperature (56) provide a digital signal to the processor 49 indicative of the actual value of the parameter measured. Thus, the sensor/transducer converts the analog data to a digital format before providing the information to the processor 49. In a preferred embodiment, at least the sensors 50–56 are dual function pressure/temperature sensors having an addressable, 14 bit analog to digital converter. The convertor is located within the sensor housing and converts the analog signal from the detecting device (e.g., strain gauge or thermistor) to a digital representative of the measured parameter The motor winding temperature sensor (58) provides an analog signal to the processor 49 indicative of the actual value of the parameter measured.

The oil level sensor 60 provides a circuit open or circuit closed signal to the microcontroller indicative only of whether the oil level safety limit value has been traversed. As explained with respect to FIG. 6, phase loss or phase reversal is preferably monitored/detected by monitoring the zero crossings of each phase with a plurality of opto-isolator devices. An alternative, separate power phase monitoring device 62 may also be used. Such a separate power phase monitoring device 62 would, for example, provide a circuit open or a circuit closed signal to the microcontroller to indicate whether a phase loss or phase reversal has occurred.

The processor 49 of each BCCSCM 48 checks the inputs from each sensor to determine whether a safety limit value for any of the measured compressor characteristics has been exceeded. If no safety limit values are exceeded, the processor 49 loads the sensor data for transmission to the master controller 70 when the processor is queried. The master controller 70 is the master network controller in standard operation of the system. In the illustrated embodiment, the microcontroller of the processor 49 stacks the information in its communication slave to await transmission to the master controller 70. The processor 49 then waits for a message from the master 70 containing commands and a query for the sensor data. As soon as the message is received, the processor 49 responds over the communication and power line of the two wire bus 80 to the controller 70 with the information data stored from the sensors 50–62.

Data from all of the processors 49 flows in a stream over the communication and power line of the bus 80 to the communication module 76 and thence to the CPU 72 of the rack master controller 70. The communication protocol allows the CPU 72 to associate the operating parameter information received with particular compressors, and to discriminate between different operating parameters for each compressor. More specifically, each BCCSCM 48 is assigned a particular address, which allows the controller 70 to communicate individually with each of the BCCSCM's over the same line, and also allows the BCCSCM processors 49 to identify themselves to the master controller.

The data is now available through interfacing with the rack master controller 70, either remotely or by a local human machine interface, to view individual compressor data. The processor 49 also looks for the command portion of the master controller message for a command to turn the compressor (14A, 14B or 14C) on or off. If such a command is present, the processor 49 executes it by operating the solid state relay (switch device 64) to turn the compressor on or off. However, if the command is to turn the compressor on, the processor 49 will not execute it if the processor has previously determined that a safety limit value of one of the safety parameters has been traversed. It is envisioned that other capacity control commands could be received and executed by the processor such as when the compressor was of a variable capacity type. The software of the processor 49 then returns to the initial step of reading the sensor inputs.

However, when one or more of the inputs from the sensors 50–62 to the processor 49 traverses a safety limit value, the processor loads a safety exception message for the rack master controller 70 and immediately shuts down the compressor (e.g., compressor 14B). The safety exception message is loaded into the communication slave of the processor 49 at the top of the stack of information to be sent to the master controller. When the processor 49 receives a message from the master controller 70, it responds by including the safety exception message for the controller. The controller 70 will know not only that one of the safety limit values for a particular compressor was traversed, but which safety parameter or parameters were traversed and in most instances the actual values of those parameters. An alarm can be activated by the controller to alert the appropriate persons that a problem exists. The information can be accessed by a technician via a suitable HMI in the system (located, for example, at the controller 70), or remotely such as through an Internet connection. Thus, the technician is able to know immediately the nature of the problem for more efficient troubleshooting. The information regarding the operating parameters of the properly functioning compressors (e.g., 14A, 14C) can also be accessed in this manner.

The master controller 70 will also receive information concerning control parameters of the compressors 14A, 14B, 14C. A primary control parameter is suction pressure. The controller 70 is programmed so that it manipulates (e.g., such as by averaging) the suction pressure readings from the BCCSCM's 48 to determine the refrigeration level produced by the multiplexed compressors 14A, 14B, 14C. The controller 70 uses this information to strategize cycling compressors in the system to achieve the desired refrigeration capacity level. Other control parameters such as suction temperature, discharge temperature and discharge pressure are also used by the controller to control the system. For instance, the suction temperature readings may be used to adjust electronic expansion valves (not shown). The controller is configured to ignore in its calculations of collective suction pressure any compressor which is turned off or which has an anomalous suction pressure reading.

Figure 5:
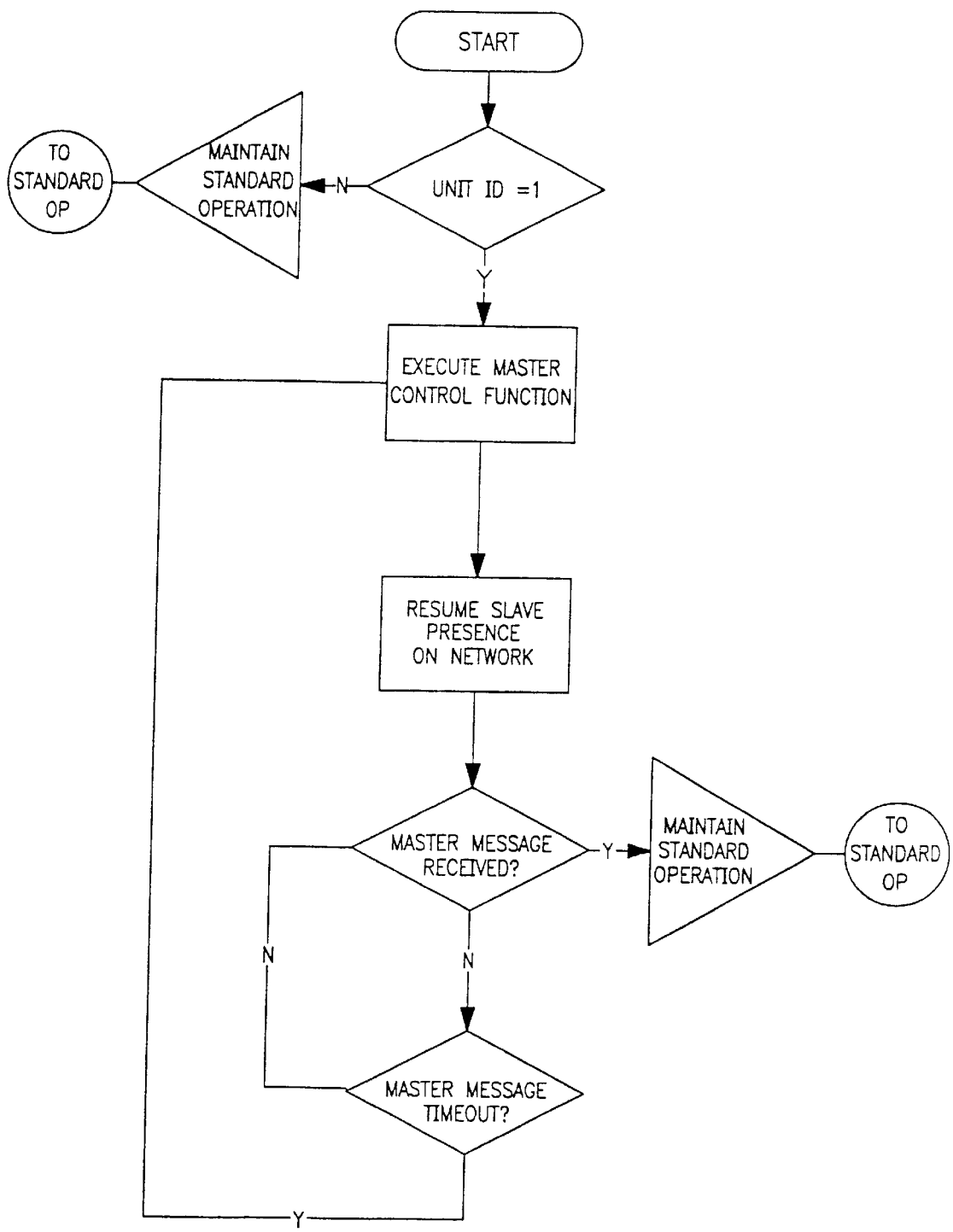
FIG. 5 is a flow diagram illustrating operation of the control and safety module in a master controller failure mode.

An important feature of the invention is that should the master controller 70 (and in particular the CPU 72) fail, the BCCSCM's 48 are capable of performing the controller functions for the compressors 14A, 14B, 14C. A flow chart of the operation of the processors 49 in the master fail mode is shown in FIG. 5. As stated above with reference to FIG. 4, the processor 49 of each BCCSCM 48 waits a predetermined time period for a message from the master controller 70. If the period times out with no message, the processor 49 defaults to a master fail operation mode. The processors of the other compressors will opt to this mode as well. The BCCSCM's 48 communicate with each other over the communication and power line of the bus 80, in addition to communicating with the controller 70. In the failure mode, each processor 49 determines whether it is to have primary control. One BCCSCM's processor 49 will have previously been programmed with a certain identification or address, e.g., ID=1. Typically, this would be the BCCSCM 48 of the first compressor 14A in the system. Any BCCSCM not having this identification will continue to operate only responsively to commands received over the field bus network (i.e., it resumes standard operation as a slave). It is also envisioned that the slave processors 49 (i.e., processors associated with compressors 14B, 14C) would start a second timer once entering the failure mode to look for a message from the processor of the BCCSCM 48 designated for primary system control in the failure mode (i.e., the processor associated with compressor 14A). If the other processors do not receive such a message, a second BCCSCM 48 would be pre-selected (e.g., the BCCSCM having ID=2 associated with compressor 14B) to control the operation of the system in the failure mode. Thus, the system is highly granular, allowing for multiple failure while maintaining operation.

For disclosure purposes, the processor 49 of the BCCSCM 48 of compressor 14A is identified as the primary control or master, in case of failure of the master controller 70, and will execute a master control function involving at least basic compressor cycling. In that regard, the primary control processor 49 is capable of determining the collective suction pressure of the operating compressors 14A, 14B, 14C and providing control commands for itself and the other slave processors to turn compressors on and off to maintain the refrigeration capacity requirements of the system. After performing this function, the "primary" processor 49 resumes a slave presence on the network which allows it to again look for a message from the master controller 70 for a period of time before returning again to perform a system control function. Once the master controller 70 is detected, the primary control processor 49 returns to its standard (slave) mode of operation.

The distributed intelligence control for commercial refrigeration achieves objects of ease of assembly and installation, and enhanced control. The compressors 14A, 14B, 14C of the present invention are configured with one or more sensors (50–62) to optimize uniformity of measurement of operation parameters and to minimize installation variances as well as provide protection of such sensor devices. The modularity of the BCCSCM of each compressor and its intelligence interface with the master controller 70 to assure optimum compressor performance, as well as granularity of the system.

Assembly of a refrigeration system is made easier by simplification of the wiring which must be done upon installation. The high voltage lines 44A, 44B, 44C must still be run to the compressors 14A, 14B, 14C for primary operation, according to electrical codes, it will be necessary to shield these lines such as by placing them in conduit. However, no separate power lines other than three phase high voltage lines (44) must be run to the compressor motors 32, and it is unnecessary to run additional high voltage lines to the BCCSCM's. Instead, a single high voltage feed line 69 supplies the power supply 74 for the CPU 72 and communication module 76 and also the network power supply 78.

Power for all of the BCCSCM's 48 is supplied through the same two wire bus 80 extending from the communications module 76 to the control and safety modules 48. The bus 80 does not need to be shielded because it carries only 30 VDC power. Preferably, the wiring of the BCCSCM's 48 to the master controller 70 is done at the factory where the compressors 14A, 14B, 14C are mounted together with the controller on a compressor rack (not shown) so that no power wiring of any kind for the BCCSCM's is required at the building site. The number of BCCSCM's 48 attached to the bus 80 up to some upper limit of the controller 70 (e.g., 31) is immaterial and requires no special re-configuration of the controller.

As stated above, the connection of the BCCSCM's 48 to the communication bus 80 achieves not only power, but communications for the control and safety modules. No separate feedback wiring from the individual sensors is necessary. The BCCSCM processor 49 executes commands from the master controller 70 and is capable of reporting back to the controller that the command has been executed. The processor 49 reports the readings from all of the sensors 50–58, and not only whether a safety limit value has been exceeded, but exactly which one it is. This enables the master controller 70 to provide specific information to a repair technician without any additional wiring between the controller and the BCCSCM 48. In addition to permitting refrigeration level control by the controller 70, this allows the controller to make other adjustments in the system and to monitor trends for use in failure prediction.

The processors 49 of the BCCSCM's 48 also preferably have the embedded intelligence to operate the refrigeration system in case the master controller 70 fails. In that regard, the BCCSCM's 48 are capable of communicating with each other as well as the master controller 70 over the two wire bus 80. In case of failure of the master controller, one of the BCCSCM's 48 will take over as master or "primary" and can perform at least the function of averaging the measured suction pressure readings from the operating compressors to determine refrigeration level and determine how to cycle the compressors to maintain a predetermined capacity.

Referring still to FIG. 1, the commercial refrigeration system may also optionally include one or more liquid subcoolers 15 and an oil separation and return subsystem 17. The general operation of liquid subcoolers is known in the art. An exemplary embodiment of a control system for controlling such a subcooler and/or such an oil separation and return system, in accordance with aspects of the present invention, is described in further detail below with respect to FIGS. 10 and 10A. Examples of oil separation systems are included in U.S. Pat. Nos. 4,478,050, 4,503,685, and 4,506,523, which have been previously incorporated herein by reference.

Figure 1A:
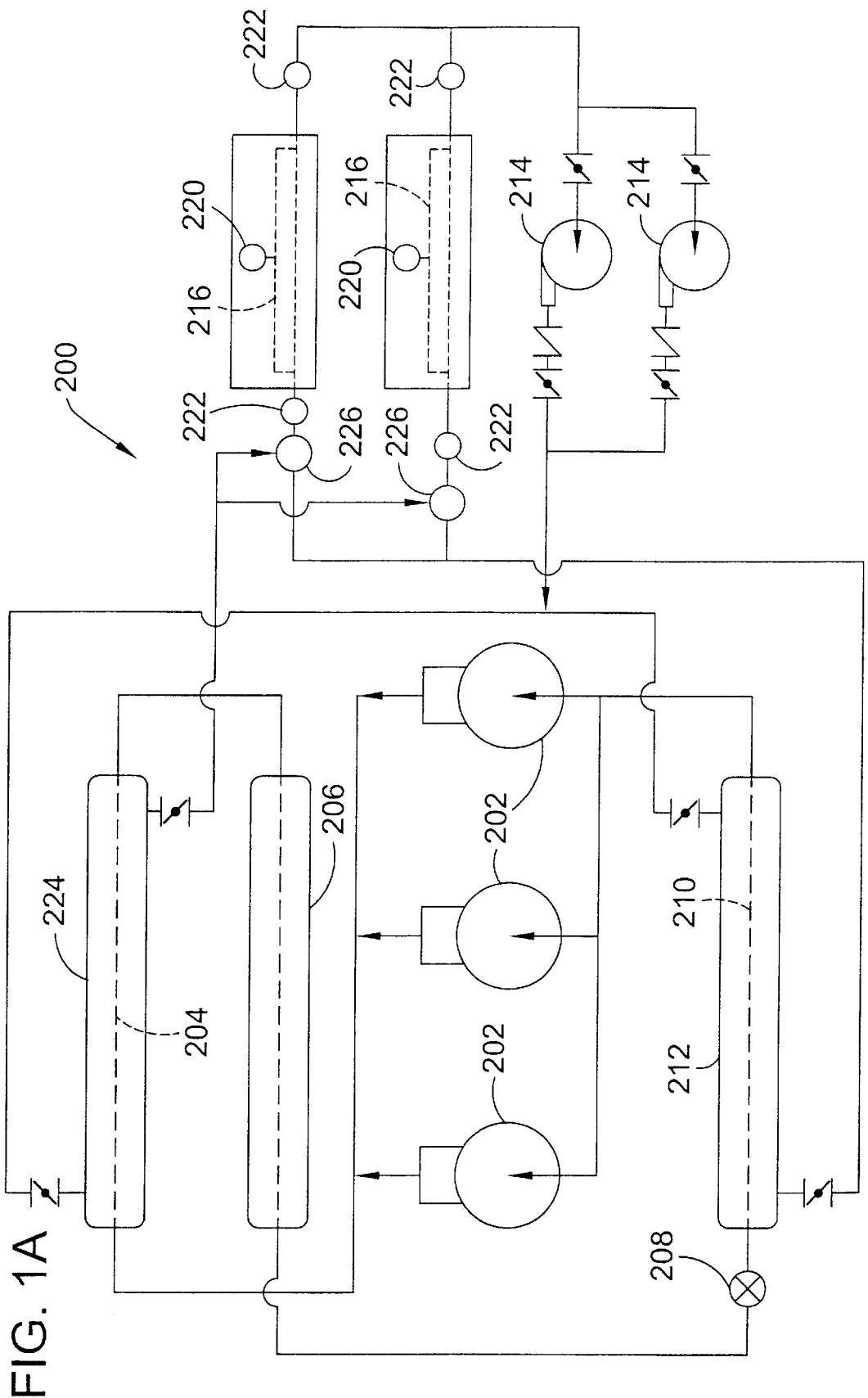
FIG. 1A is an exemplary schematic flow diagram of a secondary refrigeration system, suitable for use in connection with a distributed intelligence control system according to the invention.

For purposes of disclosure and simplicity, the refrigeration so far described herein has been, primarily, a vapor phase evaporative cooling system. The invention, however, is not to be so limited in its application. For example, FIG. 1A is a schematic diagram of one exemplary form of a modular secondary refrigeration system 200 which could also be modified to be implemented and controlled by an integrated distributed intelligence control system, according to the present invention. Such a secondary cooling system is described in exacting detail in commonly owned U.S. Pat. No. 5,743,102, the entire disclosure of which has already been incorporated herein by reference.

Referring to FIG. 1A, the refrigeration system 200 comprises a primary vapor phase refrigeration system including a plurality of parallel, multiplexed compressors 202. The compressors deliver liquid refrigerant at high temperature and pressure to a first condenser 204 and a second condenser 206 from which the liquid refrigerant passes to an expansion valve 208 feeding the refrigerant into an evaporator 210. Vaporous refrigerant is drawn from the evaporator 210 back to the compressors 202 to complete a conventional vapor phase refrigeration cycle. However, the evaporator 210 is incorporated as part of a first heat exchanger including a first reservoir 212 holding a coolant liquid (e.g., glycol). Typically, this reservoir 212 is located close to the compressors and condensers so that the vapor phase refrigerant loop is short, requiring minimal refrigerant. The first reservoir 212 is part of a secondary refrigeration system including pumps 214 which drive coolant fluid through the reservoir to second heat exchangers 216 located in respective fixtures 218, which may constitute refrigerated merchandisers in the shopping arena of a supermarket. The coolant liquid absorbs heat from items (not shown) in the fixtures 218, while remaining in a liquid state, and then is forced by the pumps 214 back to the first reservoir 212 where that heat is removed to the vapor phase refrigeration system. The vapor phase refrigeration system may beneficially be, but is not necessarily located adjacent to the fixtures 218. The temperature of the fixtures 218 may be maintained through the use of sensors (e.g., sensors 220) which control valves 222 and the pumps 214. The control system of the present invention may be beneficially used to control the operation of the primary vapor phase and secondary liquid refrigeration systems according to the principles set forth herein.

The refrigeration system 200 further includes a coolant liquid defrost system comprising a second coolant liquid reservoir 224 which contains the first condenser 204. The coolant liquid system pumps 214 are valved to divert some of the coolant liquid to the reservoir 224 where it is heated by the hot refrigerant passing through the first condenser 204. At a predetermined interval or when it is sensed that frost has built up on the second heat exchangers 216, valves including defrost valves 226 are controlled to stop the flow of cold coolant liquid from the first reservoir 212 to the second heat exchangers 216 and to permit flow of heated coolant liquid to the second heat exchangers for defrosting. Again, the control system of the present invention may be beneficially employed to control operation of the defrost of the system 200. Additional aspects of secondary cooling systems, including specific valving and flow control structures, are disclosed in U.S. Pat. No. 5,743,102. Accordingly, one skilled in the art having the benefit of the present disclosure could adapt the teachings herein for use with secondary cooling systems by providing similar distributed, modular control and monitoring of the compressors, valves, set points, and other components/sensors associated with such secondary cooling systems.

Figure 7:
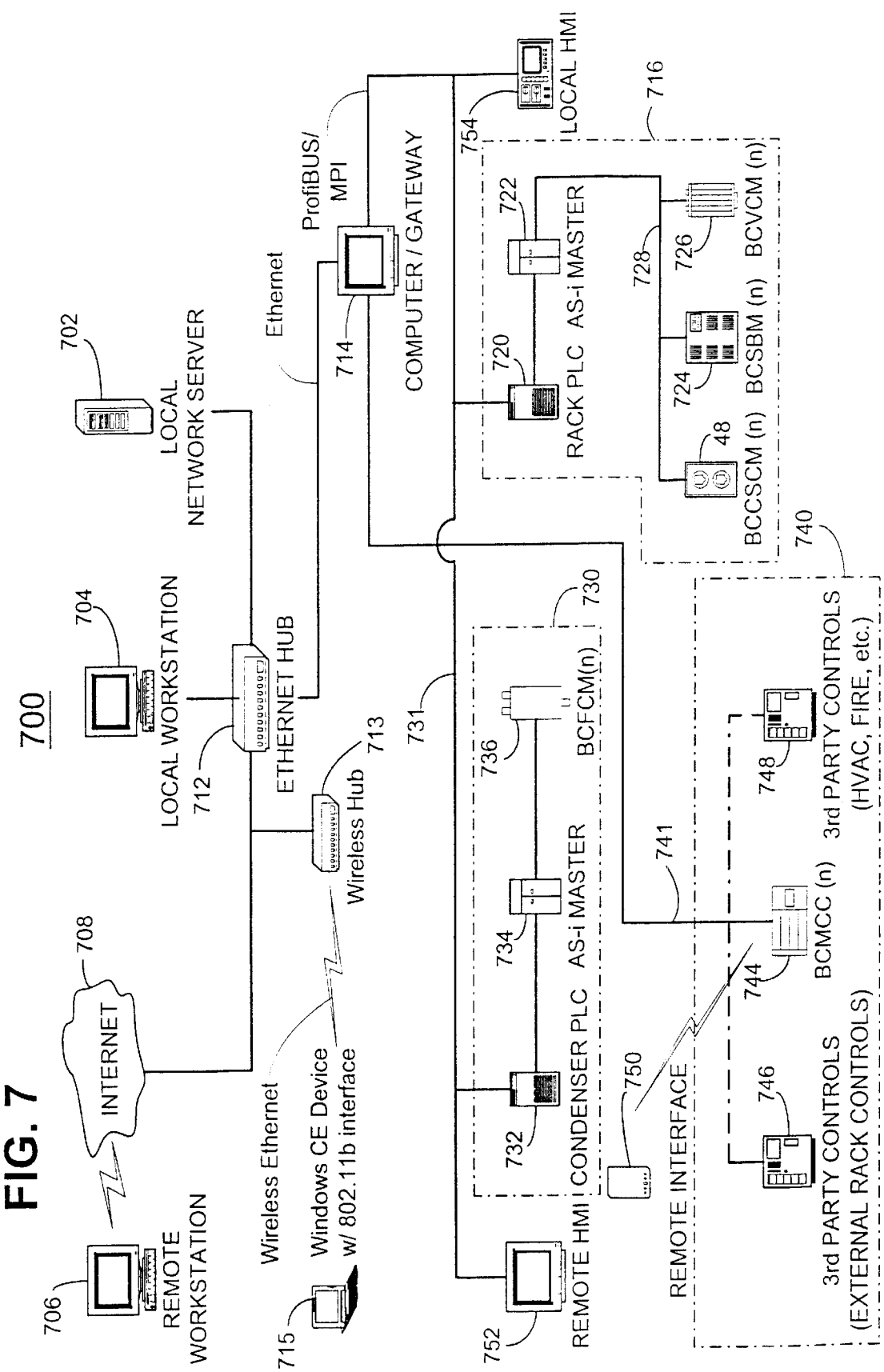
FIG. 7 is a system block diagram illustrative of aspects of a commercial refrigeration system of the present invention suitable for use in a food store.

FIG. 7 is a system block diagram, illustrative of an integrated distributed intelligence control system 700 for use in a commercial refrigeration application, such as in a supermarket. As depicted therein, the system 700 preferably includes several field bus communication networks that cooperate to provide distributed intelligence system monitoring and control. A local network server 702, a local workstation 704, and a remote workstation 706 provide top-level control. Typically, the local network server 702 and the local workstation 704 will be installed near the commercial refrigeration system (e.g., inside the supermarket facility). Preferably, the remote workstation 706 is constructed and configured to communicate via a wide-area network such as the Internet 708. Other network levels are preferably connected to the top-level via an a communications interface, such as, for example, Ethernet hub 712.

A first field bus control network 716, which preferably comprises an AS-i bus as previously described herein, is connected to the Ethernet hub 712 via a gateway interface device 714 and a rack PLC 720 (also referred to as a master controller). It is to be understood and appreciated that the rack PLC 720 illustrated in FIG. 7 preferably corresponds to the CPU associated with master controller 70, which is illustrated and described with respect to FIGS. 1 and 2 above. A preferred embodiment of the gateway interface device 714 is a Siemens IPC, which is a Windows NT® based computer. As explained in greater detail below, gateway interface device 714 is constructed and arranged to provide a gateway between similar and dissimilar field bus networks having similar and dissimilar network protocols.

A wireless hub 713 may optionally be included to allow access to the control network by a work station over a wireless interface (e.g., a wireless Ethernet link), such as between a wireless computing device 715 (e.g., a Windows CE® compatible computer) and the Ethernet hub 712.

Local workstation 704, remote workstation 706, and wireless computer 715 can be used to access system information such as, for example, set points, defrost schedules, alarm logs, current system conditions (e.g., temperatures), and other system status and set point information. Likewise, these devices may be used to input system information such as temperature set points or system schedules (e.g., defrost schedules or maintenance schedules).

The first field bus control network 716 also includes an AS-i master interface 722 which serves as a communication interface between rack PLC 720 and various control modules. The AS-i master interface 722 corresponds to the communication slave discussed above with respect to FIG. 1. The devices associated with the first field bus control network 716 may be generally referred to as "rack devices," or as being "located at the rack." This nomenclature is used because in the embodiment illustrated in FIG. 7, rack PLC 720 is installed at or near the rack of compressors for which it provides system integration and control. For example, a rack will typically include between two and thirty-one compressors, and a given installation may include multiple racks. Thus, a large supermarket might have thirty-two racks of compressors, each controlled by a separate rack PLC that interfaces with a common processor or gateway device. In a preferred embodiment, each rack PLC interfaces with computer/gateway interface device 714. In such a configuration, gateway device 714 accommodates for set point control, status monitoring, fault logging, data storage, and the like for each rack PLC (and the devices integrated by such rack PLC) in the system. For simplicity, FIG. 7 depicts an installation having only a single rack, and, accordingly, a single rack PLC 720.

The control modules illustrated in FIG. 7 preferably include one or more compressor operating units 48 (e.g., Bus Compatible Compressor Safety and Control Modules or BCCSCMs), one or more branch controllers 724 (also referred to herein as Bus Compatible System Branch Modules 724 or BCSBMs), and one or more valve controllers 726 (also referred to herein as Bus Compatible Valve Control Modules or BCVCMs). When connected to the first field bus control network 716, each of these modules 48, 724, 726 communicates with rack PLC 720, via an AS-i compatible bus 728 and AS-i master 722. The operation of BCCSCM 48 has previously been described. The operational aspects of the BCSBM 724 and the BCVCM 726 are described in greater detail below.

A second field bus control network 730, which also preferably comprises another AS-i bus as previously described herein, is connected to gateway interface 714 and the master controller (rack PLC 720) over a relatively longer distance network 731 (e.g., a twisted pair network, such as, for example, a Siemens' MPI compatible interface or ProfiBUS). Preferably, the second field bus control network 730 is slaved to rack PLC 720. Second field bus control network 730 includes a condenser PLC 732, another AS-i master 734, and one or more fan control modules 736 (also referred to as Bus Compatible Fan Control Modules or BCFCMs). The condenser PLC 732 preferably corresponds to condenser controller 84, described above with regard to FIG. 1, and may also be referred to as providing a network gateway between BCFCM 736 and rack PLC 720. Operational aspects of the condenser PLC 732, AS-i master 734, and BCFCM 736 are also described above with regard to FIG. 1.

A third field bus control network 740 communicates with rack PLC 720 over another relatively longer distance communication bus 741, such as, for example, a LonWorks® network (also referred to as a LonWorks® bus or an Echelon network). LonWorks® information and network components are available from the Echelon Corporation of Palo Alto, Calif. The third field bus control network 740 is used to facilitate communications between the master controller (rack PLC 720) and one or more refrigeration cases which are controlled by one or more case/fixture controllers 744 (also referred to as Bus Compatible Modular Case Controls, BCMCCs, case controllers, or display case controllers), the operation of which is described below. Communications between the BCMCC 744 and rack PLC 720 occurs via interface gateway 714 and the communication bus 741. The type of gateway device used will typically depend upon the bus/communication protocols employed. In the system illustrated in FIG. 7, BCMCC 744 preferably operates on a LonWorks®/Echelon compatible bus, thus interface gateway 714 is preferably constructed and arranged to integrate communications between such a bus and rack PLC 720.

Also, as illustrated in FIG. 7, third party controls 746, 748 (e.g., HVAC, fire, and rack/case controls) may optionally interface to, and become part of, system 700, via communication bus 741. Thus, the present invention advantageously facilitates interoperability between control systems from different sources that are compatible with the gateway and communication standard used for the associated communication bus (e.g., AS-i, ProfiBus, LonWorks®/Echelon, or Ethernet). Using distributed intelligence control system 700 for example, third party controls 746, 748 may be integrated and used if such controls are compatible with LonWorks®/Echelon interface standards and protocols. A third party fixture/case controller that is compatible with communication bus 741 and interface gateway 714 can be used to interface with and control one or more refrigerated fixtures (not shown) via a case/fixture controller (e.g., BCMCC 744). In such a system, rack PLC 720 advantageously continues to maintain integrative control over the entire system by retaining knowledge over the operation of BCMCC 744. Accordingly, even when third party controls are desired or required for a part of the overall refrigeration system, the advantages of modularity and distributed control made possible by the present invention are not lost.

BCMCC 744 and the third party controls 746, 748 may be collectively referred to as remote terminals associated with third field bus control network 740. In one embodiment, the communication bus 741 comprises a wireless RF interface (also referred to as an RF link) such that no wiring is required between the remote terminals and the interface gateway 714. Using a wireless RF interface provides substantial advantages, including reducing the amount and complexity of field wiring needed to install the system, and greatly reducing the risk of damage due to external influences such as lightening strikes, high voltage arcing, or high current transmissions in adjoining equipment/wiring. Such external influences are common in some geographic regions and can result in considerable system downtime and/or service expense. RF interfaces may be implemented using broad band spread spectrum (BBSS) transmission systems or narrow band on/off keyed (OOK) transmission systems. BBSS systems often require FCC testing and licensing, while OOK systems typically operate in unlicensed frequency bands. Also, BBSS systems provide improved data integrity performance with respect to data transmitted in harsh electrical environments, and often provide higher data throughput rates. OOK systems, on the other hand, are typically less expensive to implement. It should be understood, however, that the third field bus control network 740 may be completely "hard wired" or partially wireless and partially hard wired.

A remote, wireless interface device 750 may be used by system operators, maintenance personnel, and the like to communicate directly with one or more case controllers such as BCMCC 744. In a preferred embodiment, the interface device 750 comprises an infrared transceiver that operates as a remote keypad for a display module associated with the case controller. Thus, interface device 750 may be used to query case controllers to determine information such as current temperature or set point information or, optionally, to input set point data into case controllers. Such set point data may include, among other items, defrost schedules or temperature set point data. In the embodiment illustrated in FIG. 7, however, BCMCC 744 receives its primary control inputs from rack PLC 720.

In addition to the three field bus networks already described with respect to FIG. 7, distributed intelligence control system 700 also includes local and remote human-machine interface (HMI) devices. A remote HMI device 752 provides user access to system status information, which is transmitted to the remote HMI device via network 731. The remote HMI device 752 preferably comprises a touch screen device, such as a TP 170A device, available from Siemens (part no. 6AV6545-0BA15-2AX0). Similarly, a local HMI device 754 provides user access to system configuration data, system status data, diagnostic data, and the like. The local HMI device 754 communicates with rack PLC 720, via network 731. In the embodiment illustrated in FIG. 7, the local HMI device 754 preferably comprises an LCD display with a membrane keyboard, such as an OP3 device, which is available from Siemens (part no. 6AV3503-1DB10). Additional details regarding preferred embodiments of remote HMI device 752 and local HMI device 754 are provided in the Appendix.

One of the advantages of using a distributed intelligence control system, such as the system of FIG. 7, is that such a system is generally easier to install than conventional systems, which typically require multiple runs of high power wiring between the rack and each remotely located controlled device, such as display cases, as well as separate wiring to/from each system sensor. For example, prior art systems typically require at least one additional separate wire, often a high power wire requiring compliance with particular standards, for each system element being controlled. Moreover, the present distributed intelligence control system is preferably at least partially self-configuring. For example, each AS-i bus compatible device generates its own unique identification (ID)/address. An AS-i master queries each device on the system, and that device tells AS-i master its ID/address. Only AS-i master devices (e.g., rack PLC 720 and condenser PLC 732) on an AS-i network need to be manually identified and addressed. For example, each BCCSCM on control network 716 would indicate to rack PLC 720 that it is a compressor control module as well as its ID/address. In the event that a duplicate ID/address is generated, the AS-i master instructs the device to pick another value. Thus, as can now be appreciated, a complicated refrigeration control system may be installed with a reduced complexity in the installation process because persons installing the system need not concern themselves with all of the details associated with identifying and addressing each control module in the system.

Likewise, in a preferred embodiment each distributed control module in system 700 (e.g., BCCSCM 48, BCSBM 724, BCVCM 726, BCFCM 736, and BCMCC 744) includes processing capability, data storage capability, and provides configuration/set point mirroring whereby the most recent system configuration and set point data for each module is stored in that module. Such configuration and set point data includes, for example, module ID/address information, control system set points (e.g., case temperature), defrost cycles, alarm history, and the like. Thus, if rack PLC 720 fails and needs to be reprogrammed or replaced, the entire system partially reconfigures itself and supplies the most recent configuration and set point data to the new/repaired rack PLC. Similarly, if communication with rack PLC 720 is lost, each control module in system 70 can continue to attempt to maintain control by adhering to the most recent set points/schedules provided by rack PLC 720. In this way, the integrity and history associated with system 700 is maintained even when rack PLC 720 is replaced, thereby improving system granularity and robustness.

Figure 8:
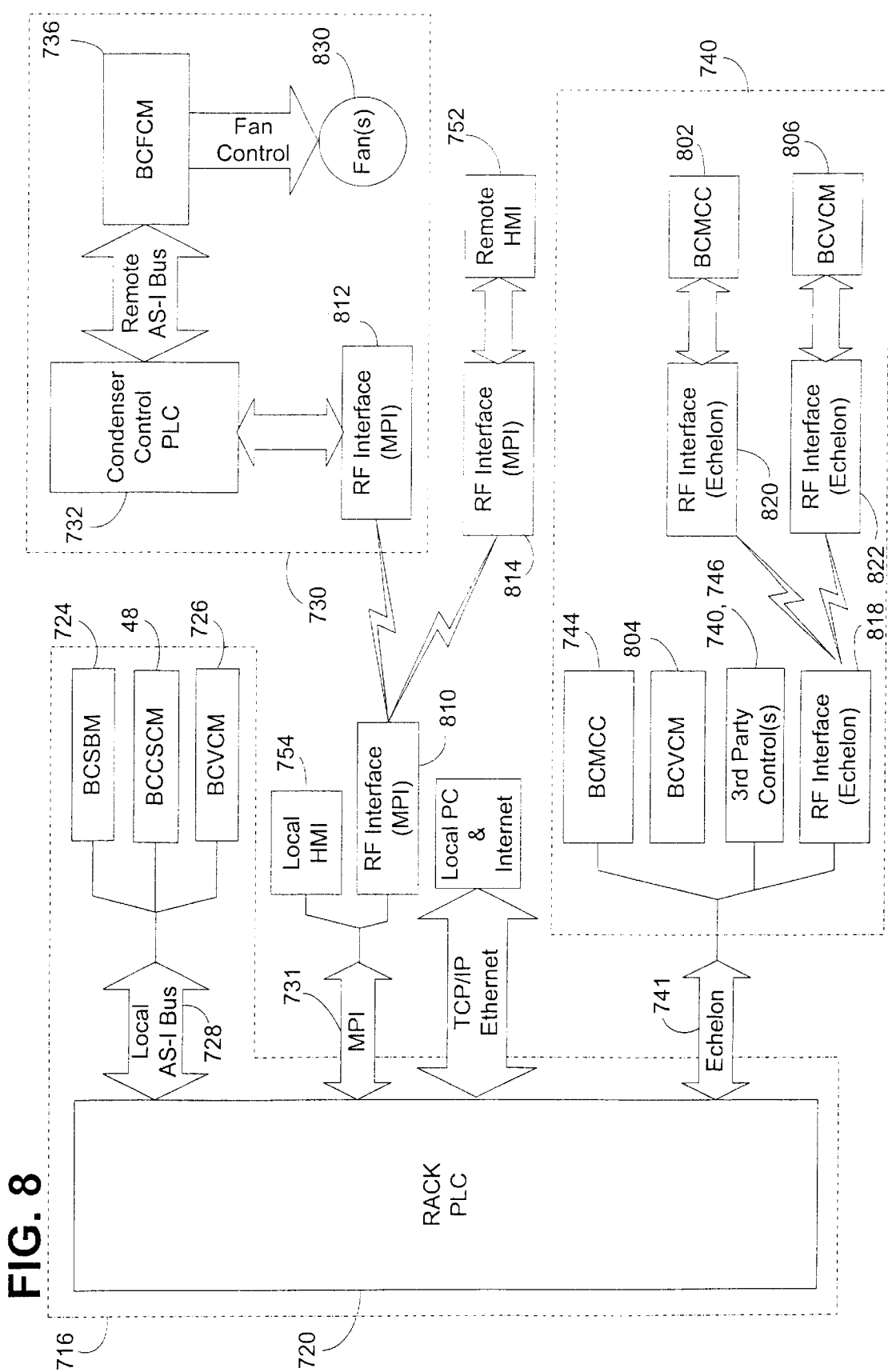
FIG. 8 is a block diagram illustrating aspects of a partially wireless embodiment of the commercial refrigeration system of FIG. 7.

FIG. 8 is a block diagram of aspects of the integrated distributed intelligence control system of FIG. 7. FIG. 8 illustrates the use of wireless interfaces between first field bus control network 716, the second field bus control network 730, and the third field bus control network 740. Further, FIG. 8 illustrates locating one or more case controllers (e.g., BCMCC 802) remote from communication bus 741. Finally, FIG. 8 also illustrates locating additional valve controllers (e.g., BCVCM 804, 806) on communication bus 741 and remotely.

In the partially wireless system depicted in FIG. 8, an MPI compatible RF interface is preferably used to facilitate communications between rack PLC 720 and condenser PLC 732, and between rack PLC 720 and remote HMI 752. More particularly, rack PLC 720 communicates via a wire-based MPI interface 731 with a first MPI compatible RF transceiver 810. It is believed that DECT compliant devices (e.g., DECT Engine MD 32), available from Siemens, can be used to facilitate an MPI compatible wireless interface. A second MPI compatible RF transceiver 812 is associated with condenser PLC 732. Similarly, a third MPI compatible RF transceiver 814 is associated with remote HMI 752.

As explained above with regard to FIG. 7, it is preferable to use a LonWorks® compatible bus system for the third field bus network 740. This is so because such compatibility is believed to facilitate connectivity and interoperability with third party controls 746, 748. Further, such a bus typically enjoys a range (i.e., the reliable length of the bus) that exceeds the recommended range of the AS-i standard. Accordingly, in the preferred embodiment illustrated in FIG. 8, LonWorks® compatible RF interfaces 818, 820, 822 are used for communications between rack PLC 720 and remote case controller 802 (BCMCC 802) and remote valve controller 806 (BCVCM 806). More particularly, the RF interfaces 818, 820, 822 comprise narrow band RF transceivers, such as RF to Twisted Pair Routers for LonWorks® (also referred to as an RF/TP-49 Router). Advantageously, RF/TP-49 Routers are designed for unlicensed operation.

As can now be appreciated from the embodiments illustrated in FIGS. 7 and 8, rack PLC 720 operates as a master device and communicates with various slave control devices via a plurality of network interfaces. For example, rack PLC 720 communicates with local device-level controllers (BCSBM 724, BCCSCM 48, BCVCM 726) via local AS-i bus 728. Rack PLC 720 communicates with condenser PLC 732 to control fan controller (BCFCM 736) and fan(s) 830 via an MPI compatible RF interface comprising a hard wired MPI interface 731 between Rack PLC 720, local RF interface 810, and remote RF interface 812. Rack PLC 720 communicates with case controllers BCMCC 744, 802 via communication bus 741, and a wireless link established between RF interfaces 818 and 820. Likewise, rack PLC 720 communicates with valve controllers BCVCM 804, 806 via communication bus 741, and a wireless link established between RF interfaces 818, 822.

Figure 9:
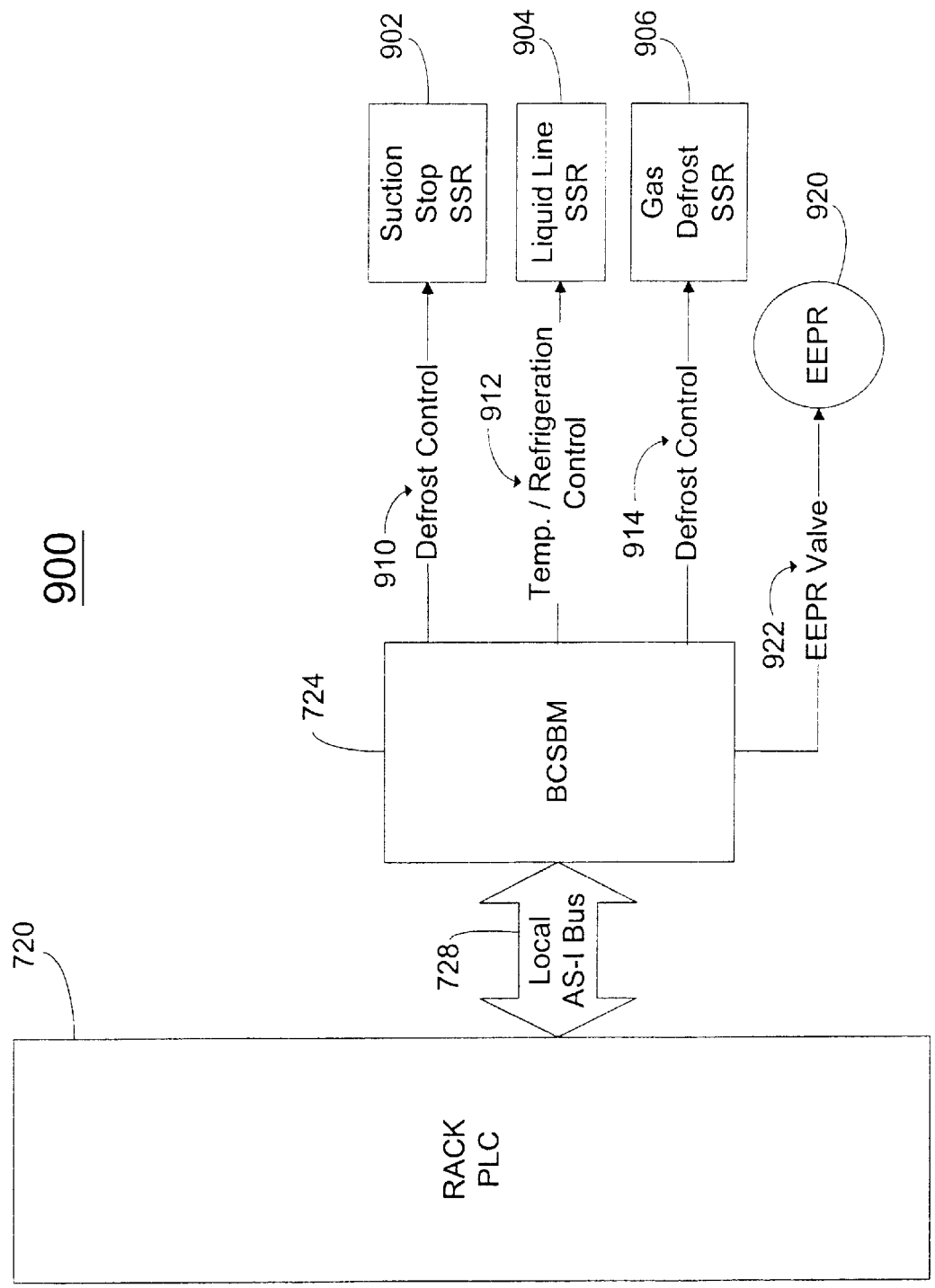
FIG. 9 is a block diagram of a bus compatible branch control subsystem, suitable for use with the commercial refrigeration system of FIGS. 7 and 8.

FIG. 9 is a block diagram of a bus compatible refrigeration branch control system 900, suitable for use as part of a commercial refrigeration system, including the systems depicted in FIGS. 7 and 8. A commercial refrigeration branch includes a number of refrigeration units (e.g., display cases, cold storage rooms, and the like) sharing a common closed-loop refrigeration control path. As illustrated in FIG. 9, a preferred embodiment of the refrigeration branch control system 900 includes a Bus Compatible System Branch Module BCSBM 724, which is constructed and arranged for communication with rack PLC 720 via field bus control network 728 (e.g., a local AS-i bus). It should be understood that multiple BCSBMs could be employed in a refrigeration system having multiple refrigeration branches. For convenience, the operation of a preferred embodiment of a bus compatible refrigeration branch control system (e.g., system 900) will be described with respect to a system having only a single refrigeration branch. It is also to be understood that the disclosure herein may be scaled to accommodate systems employing multiple refrigeration branches. The Appendix hereto identifies a preferred hardware configuration for a BCSBM. Briefly stated, each BCSBM preferably comprises a processing capability and a data storage capability.

BCSBM 724 effects branch control by controlling the operation of a plurality of solid-state relay devices (SSRs). Such SSRs may include, for example, a suction stop SSR 902, a liquid line SSR 904, and a gas defrost SSR 906. In the embodiment illustrated in FIG. 9, BCSBM 724 individually controls each of the SSRs 902, 904, 906. For example, BCSBM 724 controls the suction stop SSR 902 via a first defrost control signal 910. Similarly, BCSBM 724 controls the liquid line SSR 904 via a temperature/refrigeration control signal 912. BCSBM 724 also controls the defrost SSR 906 via a second defrost control signal 914. Each of these control signals 910, 912, and 914 preferably comprises an on/off signal, directing the associated SSR to be either open circuited (non-conducting) or close circuited (conducting). It should be understood that each of the SSRs 902, 904, 906 is connected to an associated control valve (valves not shown) such that when the corresponding control signal 910, 912, or 914 is asserted, the SSR conducts and the associated control valve is opened or closed, as appropriate. Finally, BCSBM 724 controls an electronic evaporator pressure regulator valve (EEPR valve) 920 associated with the refrigeration branch via a control line 922.

Advantageously, BCSBM 724 provides for distributed control of refrigeration and defrost cycles of an associated refrigeration branch. For example, in a preferred embodiment, temperature control for a branch may be achieved by positioning the associated EEPR valve 920. Case/fixture temperature(s) (e.g., discharge air temperature) is/are provided to rack PLC 720 by a bus compatible modular case control subsystem (e.g., BCMCC 744, which is described in greater detail below with respect to FIGS. 11–13). As such, the present system does not require wiring a separate, additional temperature sensor for branch control because existing temperature data is made available to BCSBM 724 via BCMCC 744 and rack PLC 720. Based on the provided temperature information, rack PLC 720 transmits the desired set point to BCSBM 724 over local field bus network 728. BCSBM 724 then drives EEPR valve 920 to the necessary setting via control line 922.

BCSBM 724 can also affect a degree of temperature control by cycling the liquid line solenoid (not shown) via the liquid line SSR 904. In this regard, rack PLC 720 preferably receives discharge air temperature readings from one or more display cases being cooled by the refrigeration branch. Such temperature information preferably originates from one or more bus compatible modular case controllers, as described below. Based on the received temperature information, rack PLC 720 provides liquid line commands to BCSBM 724 over local field bus network 728. BCSBM 724 thereafter cycles liquid line SSR 906 via temperature/refrigeration control line 912.

Referring still to FIG. 9, BCSBM 724 can also be used for defrosting an evaporator coil (not shown) associated with refrigeration branch. For example, in a preferred embodiment, rack PLC 720 determines the defrost scheduling for each branch. When a particular branch is scheduled to commence a defrost cycle, rack PLC 720 instructs BCSBM 724 to begin the defrost cycle. BCSBM 724 thereafter drives the first defrost control line 910 to cause the suction stop SSR 902 to operate the suction stop solenoid (not shown) so as to cut off the refrigeration cycle. At or about the same time, BCSBM 724 also drives the second defrost control line 914 to cause the gas defrost SSR 906 to open a gas defrost solenoid (not shown) that allows a gas (e.g., hot gas) to flow through the evaporator coil and through a check valve associated with the liquid line solenoid—in effect, operating the system in reverse. It is to be understood that the use of a hot gas defrost cycle reflects an exemplary embodiment only; the present system could be employed with cool gas defrosting, electric defrosting, and other known methods of defrosting. When the defrost cycle is complete (which may be determined on the basis of time or temperature or other criteria), rack PLC 720 sends an appropriate message to BCSBM 724 to terminate the defrost cycle and begin a new refrigeration cycle.

At the end of a defrost cycle, it may be desirable to initiate a drip cycle in which condensate on the coil is allowed to drip off and flow out through a drain. If a drip cycle desired, rack PLC 720 sends an appropriate command to BCSBM 724 at the end of the defrost cycle. Rather than start a new refrigeration cycle, however, BCSBM 724 removes the second defrost control signal 914 thereby causing the gas defrost SSR 902 to open the gas defrost solenoid, while BCSBM 724 continues to apply the first defrost control signal 910 and maintain the suction stop solenoid in the closed position, via suction stop SSR 902. This continues until the drip cycle terminates.

Similarly, when a fixture/case associated with the refrigeration branch is being cleaned or subject to a maintenance action, it is not normally desirable to operate a refrigeration cycle. Therefore, in such a mode, rack PLC 720 sends a command to BCSBM 724 which causes suction stop SSR 902 to close the suction stop solenoid.

Referring still to FIG. 9, modular branch control system 900 preferably provides a degree of back-up capability, thereby improving overall system robustness, should one or more components fail. For example, if communication with rack PLC 720 is lost, BCSBM 724 is preferably constructed and configured so that it maintains the recent refrigeration and defrost set point and cycle information. Thus, the refrigeration branch remains operable despite the loss of communications with rack PLC 720. Also, when multiple branch control modules are employed to control multiple refrigeration branches, it is preferable that only one branch be in a defrost cycle at any given time. Normally, this scheduling is coordinated by rack PLC 720. In the event that communications with rack PLC 720 are lost, however, each branch controller preferably continue to operate on its prior schedule so that the defrost cycles continue to run at non-overlapping times, despite the loss of communications with rack PLC 720.

Figure 11:
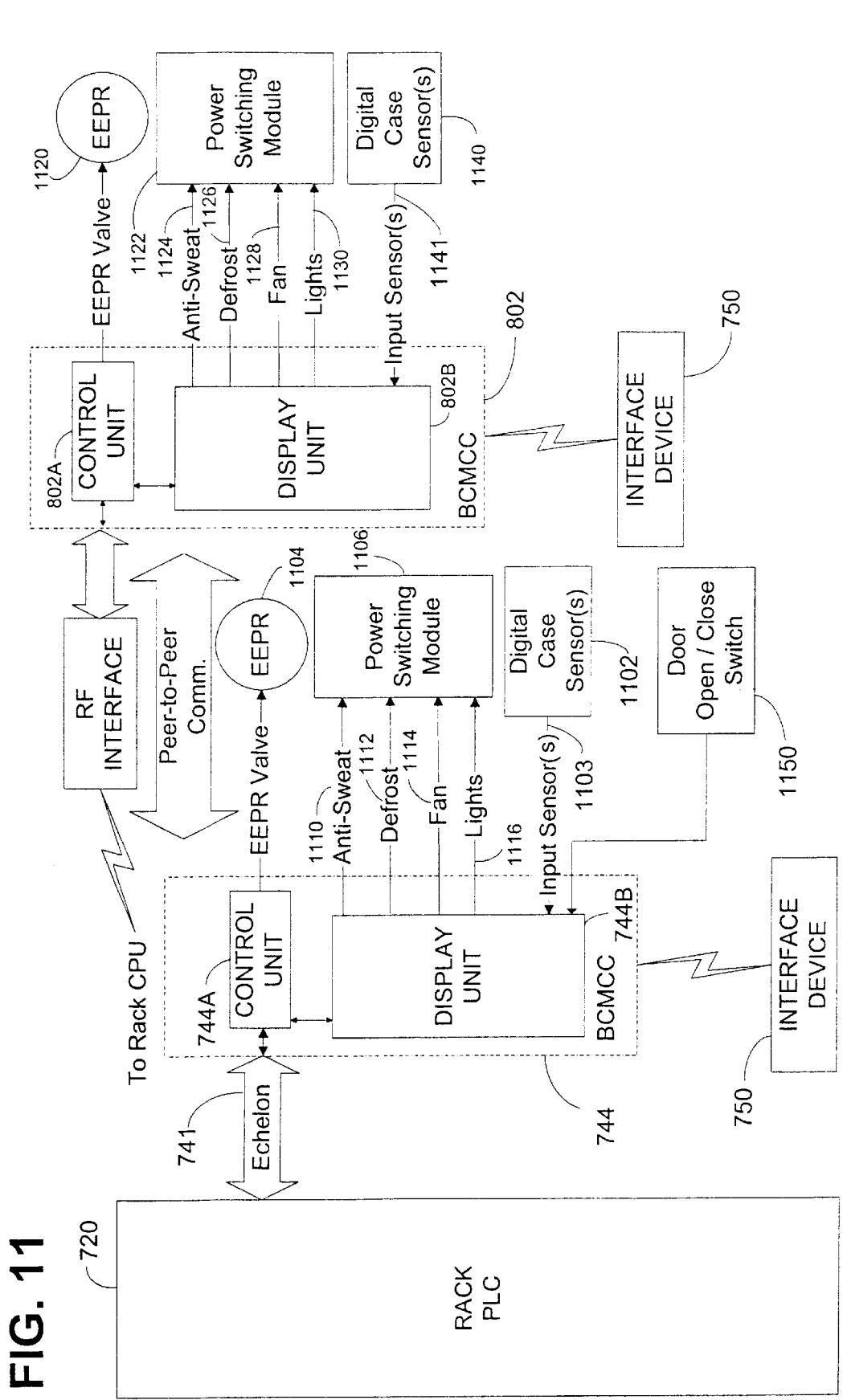
FIG. 11 is a block diagram that illustrates a system using modular case control modules to provide monitoring and control functions for a plurality of refrigeration display cases.

Similarly, if the temperature associated with one or more display cases in the branch is being controlled by a local case controller (e.g., a BCMCC as illustrated in FIG. 11) and that local case controller fails, BCSBM 724 can maintain a degree of temperature control by cycling liquid line SSR 904, in a manner similar to that described above.

Figure 10:
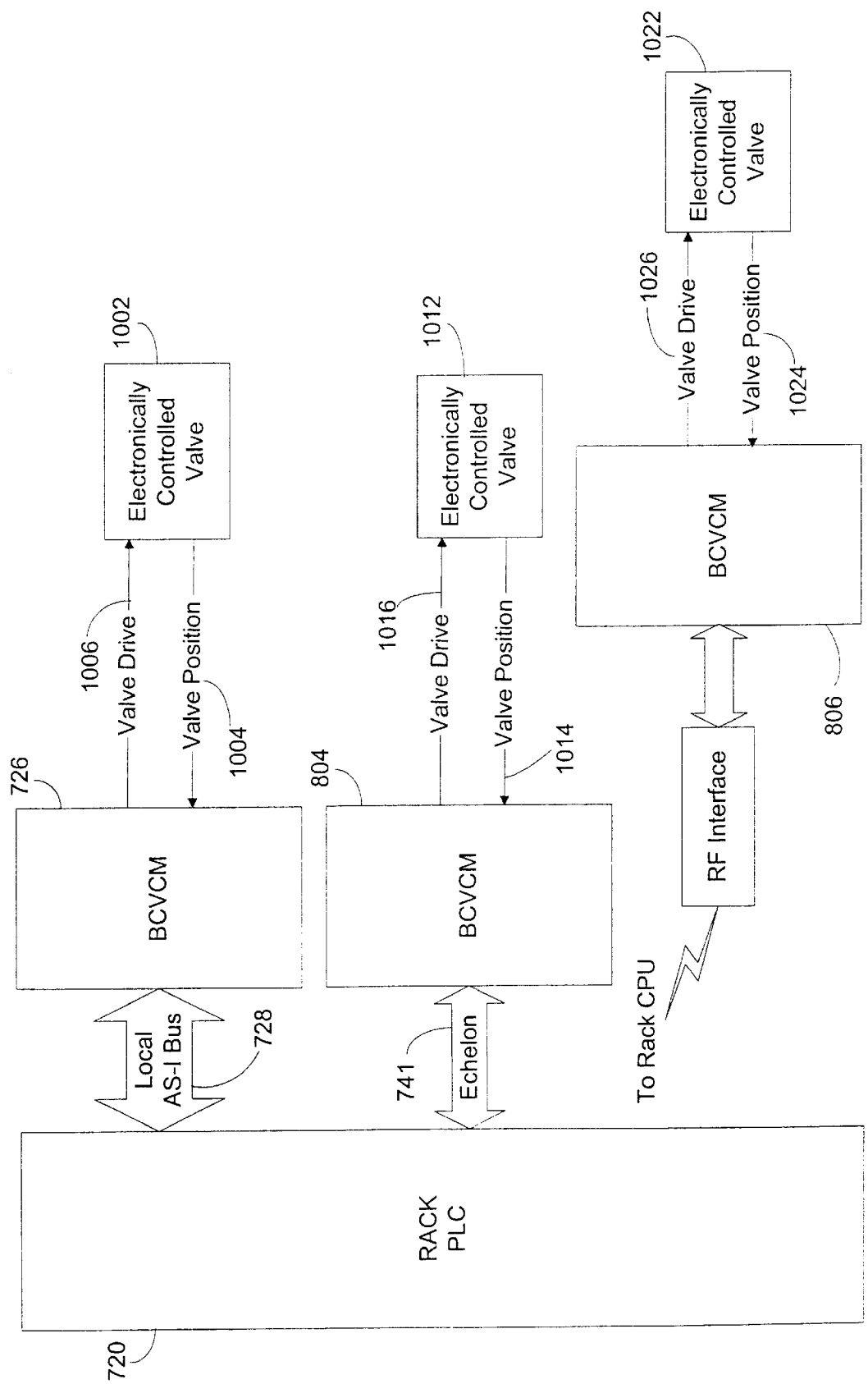
FIG. 10 is a block diagram of a commercial refrigeration system including bus compatible valve control.

FIG. 10 is a block diagram of a commercial refrigeration system that is compatible with the systems depicted in FIGS. 7 and 8, including multiple bus compatible valve controllers. The commercial refrigeration system illustrated in FIG. 10 includes one or more Bus Compatible Valve Control Modules (BCVCMs) 726, 804, 806.

Each of the BCVCMs 726, 804, 806 is preferably constructed and arranged to control an electronically controlled valve associated with the commercial refrigeration system. More particularly, each BCVCM is preferably constructed to receive at least one valve position signal and provide at least one valve drive signal. In a preferred embodiment, each BCVCM provides a stepper drive output for driving a stepper-motor controlled valve. It is to be understood, however, that the present invention may be modified for use with other types of valves, such as solenoid controlled valves. A non-exhaustive list of the types of refrigeration system valves that may be controlled in accordance with the distributed intelligence control system of the present invention include, for example, heat reclaim valves, electronic evaporator pressure regulator valves (e.g., EEPR valves using a stepper-motor rather than a solenoid valve), flooding valves, main liquid pressure reduction valves, receiver pressure regulator valves, surge receiver control valves, split condenser valves, defrost control valves, secondary cooling control valves, oil control and separation valves, and electronic expansion valves (e.g., in a display fixture or a subcooler). Other examples of systems and valves that may adapted to be controlled according to aspects of the present invention may be found in U.S. Pat. Nos. 3,343,375, 4,478, 050, 4,503,685, 4,506,523, 5,440,894, 5,743,102, 5,921,092, and 6,067,482. The Appendix hereto identifies a preferred hardware configuration for a BCVCM.

The first BCVCM 726 will be used here as a brief example. As illustrated in FIG. 10, BCVCM 726 is configured to control an electronic expansion valve associated with a subcooler (not shown) in a low temperature refrigeration branch. Those skilled in the art will recognize that subcoolers may be used to improve system efficiency by helping to shift some of the total system load from low temperature branches to medium or high temperature compressors. First BCVCM 726 communicates directly with rack PLC 720 via field bus control network 728 (e.g., a local AS-i bus) to control the operation of a first electronically controlled valve 1002. The first BCVCM 726 determines the position of the first electronically controlled valve 1002. This step is illustrated schematically as a line 1004 (see also lines 1014 and 1024). In a preferred embodiment, no physical valve position feedback lines are required. Rather, each electronically controlled valve (e.g., valve 1002) is a stepper-motor controlled valve. The associated BCVCM determines valve position by keeping track of the number of steps the stepper motor has moved relative to a known reference point (i.e., zero point). In order to maintain control, the BCVCM periodically calibrates the valve position by temporarily returning to the reference point and the moving the valve to the last commanded position (step) relative to the reference point. With the current position of the valve known, first BCVCM 726 provides the valve position information to rack PLC 720 via control network 728. Similarly, Rack PLC 720 provides a desired valve position signal to first BCVCM 726 via control network 728. Upon receipt of the desired position information, first BCVCM 726 provides a valve drive signal to the first electronically controlled valve 1002, via line 1006, to position the valve in the desired position.

The operation and control of the second BCVCM 804, a second valve 1012, and lines 1014, 1016 is substantially similar to the operation of the first BCVCM 726. This second BCVCM 804 illustrated in FIG. 10, however, is not located on field bus control network 728. Rather, BCVCM 804 is located at a position sufficiently remote from rack PLC 720 to require a different bus, such as field control bus 741 (e.g., a LonWorks®/Echelon bus). Likewise, the third BCVCM 806 operates substantially similarly to the first and second BCVCMs 726, 804, except that BCVCM 806 preferably communicates with rack PLC 720 via a wireless RF interface (as also illustrated in FIG. 8).

As can now be appreciated, employing valve controllers such as BCVCMs 726, 804, and 806 facilitates distributed control of the total refrigeration system and minimizes the amount of high power wiring required to provide integrated control of a plurality of system valves.

It should be understood that while FIG. 10 illustrates a system having three BCVCMs—BCVCM 726 located on a local AS-i bus, BCVCM 804 located on bus having a relatively longer distance capability (e.g., control bus 741), and BCVCM 806 located on an RF compatible bus—the invention is not limited to such an arrangement. Rather, a BCVCM may be used with each motor-driven valve requiring independent monitoring and control. Examples of such motor driven valves are provided in the Appendix.

Figure 10A:
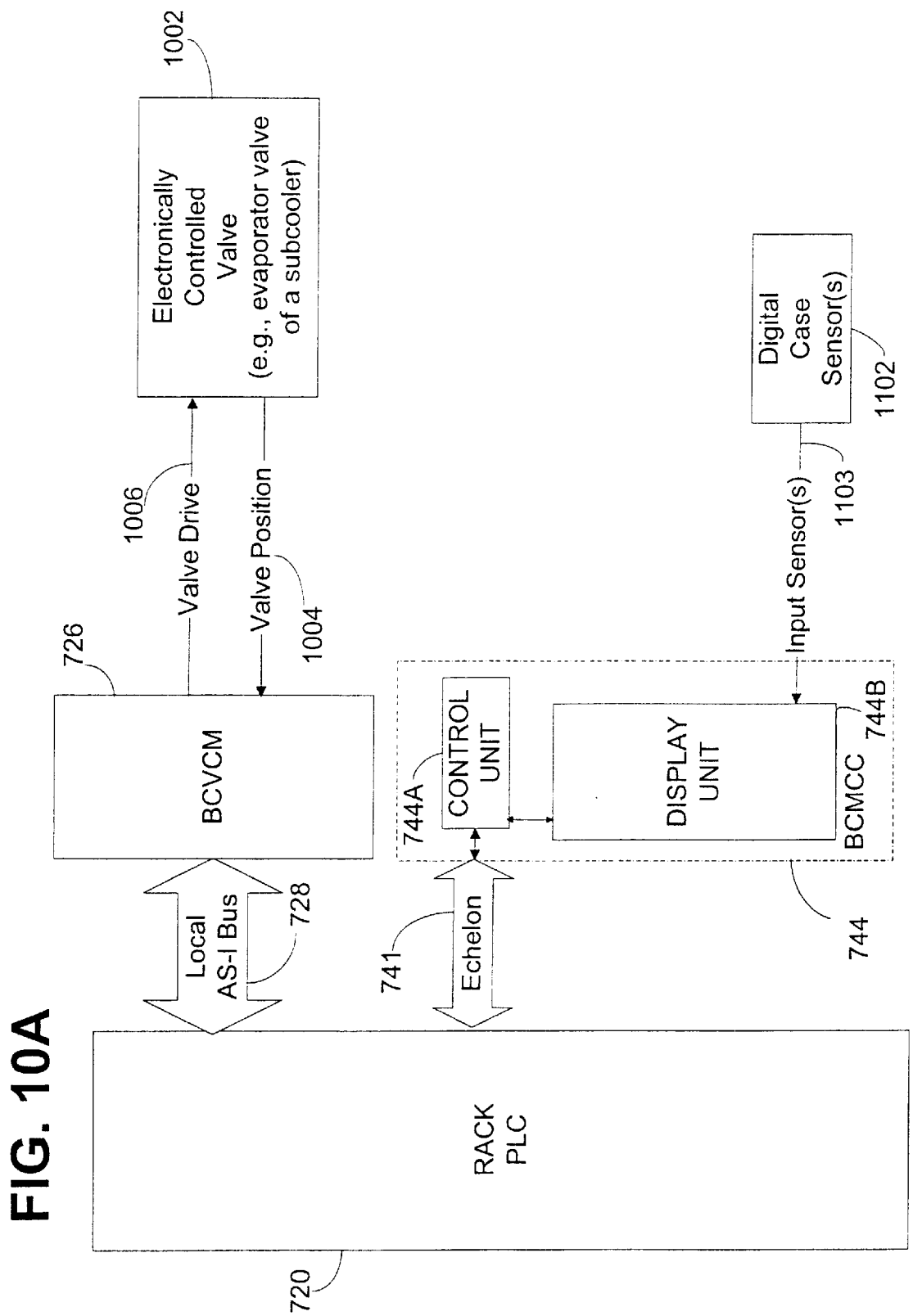
FIG. 10A is a block diagram of a particular exemplary embodiment of the system of FIG. 10 using valve controller to control an evaporator valve associated with a subcooler.

FIG. 10A is an exemplary schematic of an aspect of the present invention related to peer-to-peer control/communication. More particularly, FIG. 10A illustrates peer-to-peer communications between a case controller configured as a fixture/display monitor (e.g., BCMCC 744; see also FIGS. 11–13) and a valve controller configured to control an evaporator valve associated with a subcooler on a low temperature refrigeration branch. A liquid temperature probe (e.g., digital case sensor 1102) is installed at the inlet to each expansion valve or, alternatively, at the liquid line inlet to each case/fixture lineup (not shown). The liquid line probe provides digital temperature data to the case controller (BCMCC 744), which provides the temperature data to rack PLC 720. Rack PLC 720 supplies an evaporator valve control command to the valve controller (BCVCM 726) which causes the valve controller to drive valve 1002 to the desired position. Alternatively, the valve controller can be programmed to determine the correct position of valve 1002 based on temperature data passed to it by case controller 744, via rack PLC 720.

Figure 12:
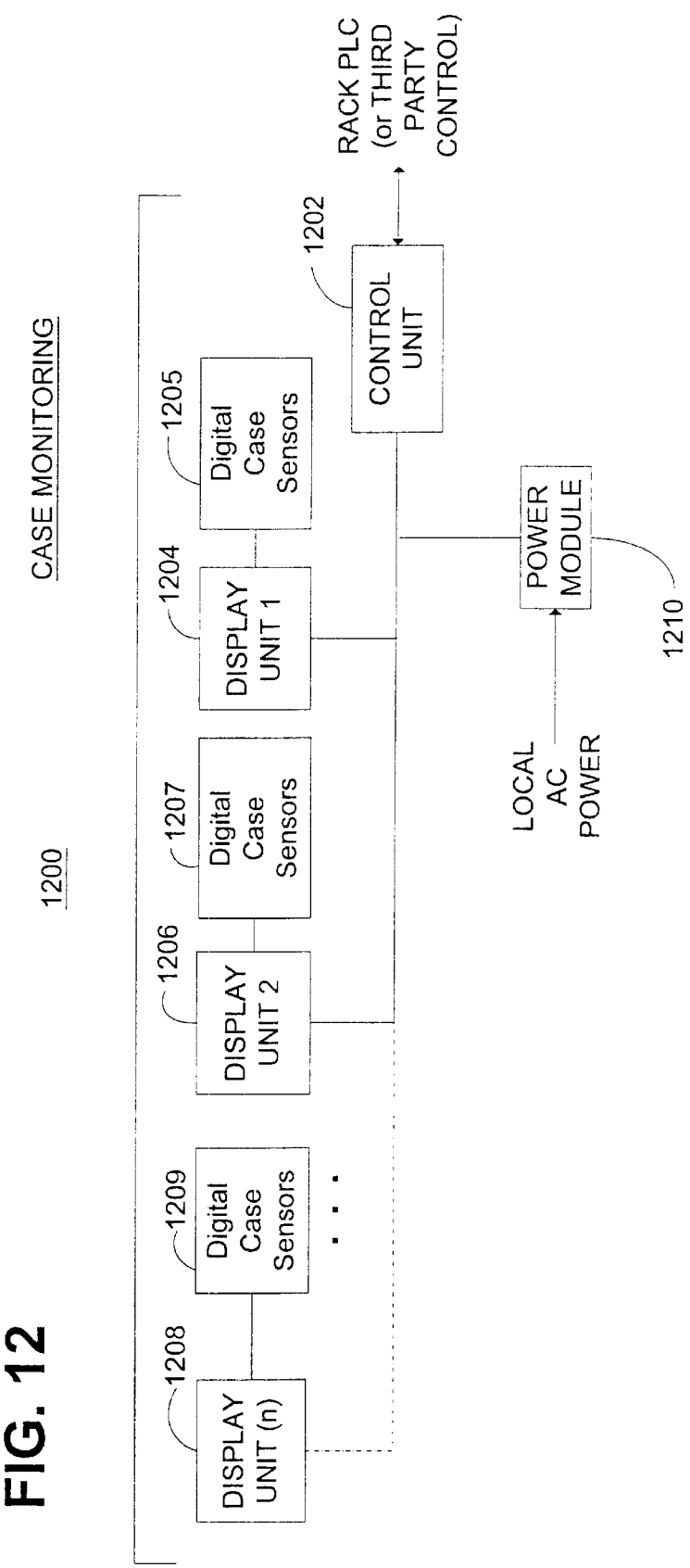
FIG. 12 is a block diagram that illustrates the use of a modular case controller configured for display case monitoring.
Figure 13:
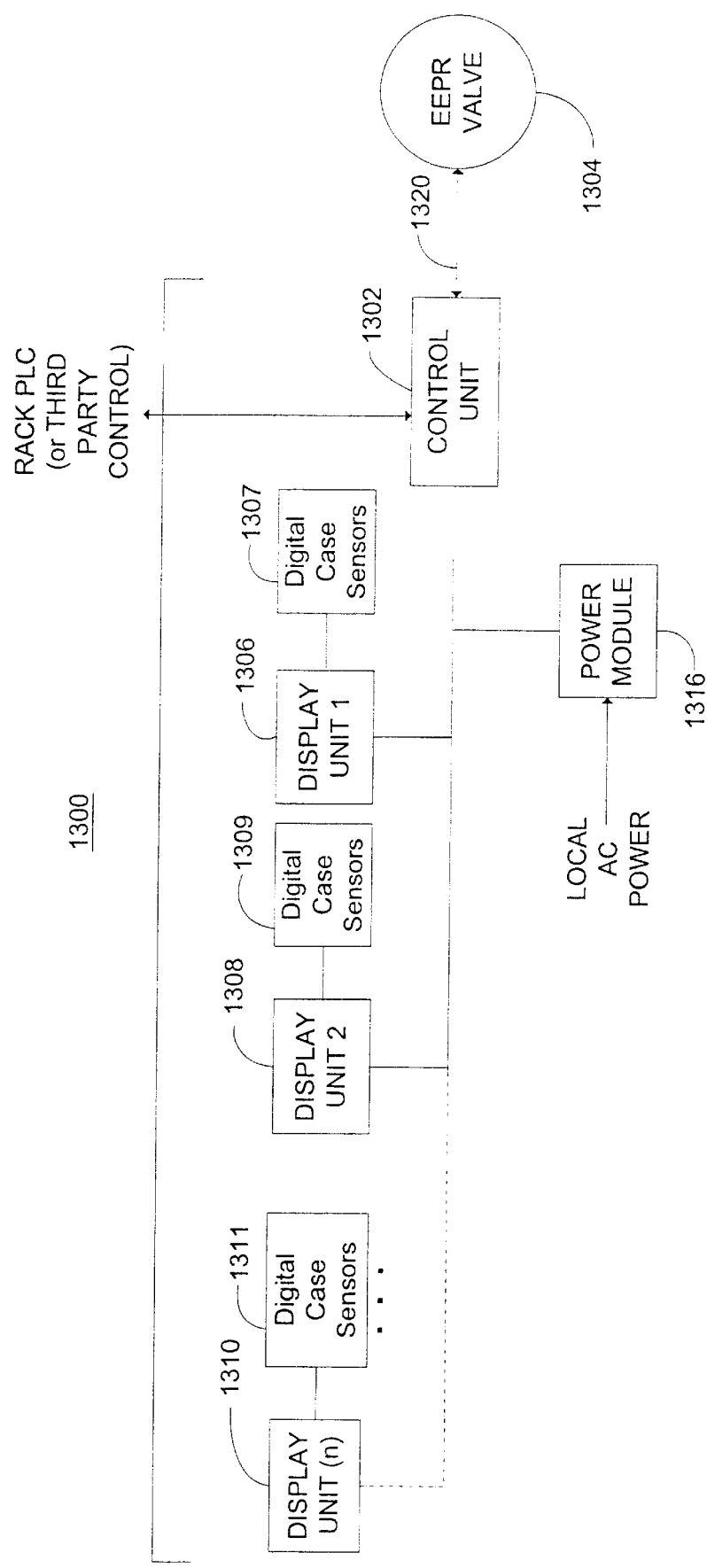
FIG. 13 is a block diagram that illustrates the use of a modular case controller to provide branch control for a plurality of display cases configured in a refrigeration branch.

FIGS. 11–13 are block diagrams of aspects of a commercial refrigeration system according to FIGS. 7 and 8, including various system configurations providing bus compatible modular case monitoring and/or control. Briefly stated, FIG. 11 illustrates a system using bus compatible modular case controller (e.g., BCMCCs 744, 802) to provide case monitoring and control functions for a plurality of refrigeration display cases (not shown in FIG. 11). Similarly, FIG. 12 illustrates a modular case control system 1200 configured to provide case monitoring information for use by a system controller, such as, rack PLC 720, or third party controller 746 (FIG. 7). Finally, FIG. 13 illustrates the use of a modular case control system 1300 to provide branch control for a plurality of display cases comprising a refrigeration branch.

Referring now to FIG. 11, a first BCMCC 744 is constructed and arranged to communicate with rack PLC 720 via control bus 741 (e.g., a LonWorks®/Echelon bus as shown in FIG. 7). A second BCMCC 802 is constructed and arranged to communicate with rack PLC 720 via a wireless RF interface (see also FIG. 8). It should be understood that FIG. 11 is provided for exemplary purposes only; a given commercial refrigeration installation may include one or a plurality of BCMCCs, each having either a hard wired or wireless interface with a controller such as rack PLC 720 or third party controller 746.

Each BCMCC preferably comprises a control unit (also referred to as a control module) and, possibly, one or more display units (also referred to as display modules). The control unit is responsible for network communications (e.g., control unit 744A communicates with rack PLC 720 via control bus 741). The control unit also includes a stepper drive output for controlling an EEPR valve. The display unit receives sensor data from one or more associated sensors and controls the power switching of various fans, anti-sweat heaters, lights, and defrost heaters via an associated power switching module. As will be made clear by reference to FIGS. 12 and 13 below, one control unit can control multiple display units via a serial link. For example, in a preferred embodiment, one control unit is capable of interfacing with up to eight distinct display units. Thus, although FIG. 11 illustrates a configuration having one display unit per control unit, such a configuration is not required by the present invention. Each control unit and display unit preferably includes a data processing capability, as well as a data storage capability.

Using BCMCC 744 as an example, a display unit 744A receives temperature information from one or more digital case sensors 1102. The digital case sensors 1102 are preferably constructed such that they are individually addressed and provide case temperature data to BCMCC 744 in digital form over a single wire harness 1103. For example, a plurality of digital case sensors 1102 provide digital temperature data with respect to each display case controlled by BCMCC 744. It is to be appreciated that one or more digital case sensors 1102 may be used with each case. Display unit 744B provides the digital temperature data to control unit 744A. Control unit 744A supplies the temperature data to rack PLC 720 via control bus 741. Rack PLC 720 uses the temperature data, along with other system information, to determine appropriate display case control activities. Further, based on system data, including this temperature data, rack PLC 720 determines an appropriate set point. The desired set point is transmitted to control unit 744A, which adjusts the EEPR valve 1104 accordingly. Rack PLC 720 also determines when a particular case requires a defrost action, fan control action, or lighting action. Using case lighting as an example, rack PLC 720 preferably determines when a particular case is to be illuminated and provides an appropriate command to control unit 744A, which relays the command to display unit 744B. Display unit 744B asserts a signal on line 1116 to cause a power switching module 1106 (also referred to as a power module) to activate the light(s) of the associated case(s) (not shown). Similar control actions are taken for defrost cycling (via line 1112) and fan control (via line 1114). Anti-sweat control actions (e.g., for anti-sweat heaters associated with display fixtures having reach-in doors) are also accommodated by the display unit and power switching module. It is noted, however, that many newer display fixtures do not require complicated anti-sweat controls.

Advantageously, each power module (e.g., power module 1106) may also serve as a local source of power for each BCMCC (including both the control module and the display module). For example, local AC power (not shown) is supplied to BCMCC 744. Power module 1106 converts the local AC power to DC power for use by BCMCC 744. Accordingly, the only wiring used to interface between a BCMCC with other devices in the control system (e.g., rack PLC 720) is relatively low power signal wire, some of which may be replaced by wireless interfaces, as explained herein.

When a BCMCC (e.g., BCMCC 744) is configured to control the power switching of display case activities (e.g., anti-sweat, defrost, fan, or lights), a separate power module (e.g., power module 1106) is preferably provided with each display unit, as shown in FIG. 11. If, however, a BCMCC is not used to control power switching of display case activities, only a single power module is required for each control unit associated with the particular BCMCC. This aspect of the system is illustrated in greater detail with respect to FIGS. 12 and 13 below.

Although in the embodiments illustrated in FIGS. 7, 8, and 11 each BCMCC is ultimately controlled by a master controller (e.g., rack PLC 720), one or more BCMCCs in a given refrigeration control system may optionally be configured for peer-to-peer control/communication. Hence, multiple BCMCCs can share temperature data, time data, defrost scheduling data, and the like to improve system efficiency. For example, by sharing information regarding defrost timing, each BCMCC on a given circuit can wait until all displays finish defrosting before starting a refrigeration cycle. By sharing information, such as current defrost status information, each BCMCC is capable of initiating coordinated defrost cycles to maintain minimum refrigeration load requirements and/or ensure sufficient defrost gas (for gas defrost systems).

Advantageously, using the present modular case control system also improves total system fault tolerance. In the event of a network failure, such as the loss of communications with rack PLC 720, each BCMCC is preferably configured to revert to an internal schedule and will attempt to provide temperature control by determining the appropriate setting of its corresponding EEPR valve. Using BCMCC 744 of FIG. 11 to illustrate this aspect of the invention, if communication with rack PLC 720 is lost, BCMCC 744 attempts to maintain display case(s) temperature at the most recent set point by internally determining a desired setting for EEPR valve 1104. Similarly, display unit 744B continues to provide power switching control for display case activities on an internally derived schedule.

An interface device 750 (e.g., a wireless device using an IR interface) supplies a capability to read and set case/fixture specific data. As described above with respect to FIG. 7, interface device 750 comprises a remote keypad for use with display unit 744B to access temperature data and/or to input set point data. Thus, it is possible to input and monitor set point data and other data associated with a display case using a BCMCC without the use of a master system controller, such as rack PLC 720. It should be understood, however, that when a master controller is present, such controller would preferably override any user set points entered via interface device 750.

Optionally, each display unit (e.g., display unit 744B) may receive one or more general purpose switch inputs. For example, a door open/closed input 1150 may be supplied to display unit 744B when the display unit is used with a walk-in freezer. Display unit 744B could use the door open/closed input 1150 as an indication to turn off the fan(s) (via line 1114 and power switching module 1106) whenever the door is open. Likewise, if door open/closed input 1150 may be used to set an alarm condition, including an audible alarm, if a door is left open longer than a threshold time (e.g., 5 minutes). Other possible switch inputs include a defrost temperature probe (not shown) that provides a discrete switch signal at a preset temperature, indicating that a defrost cycle may be terminated.

Referring still to FIG. 11, the operation of BCMCC 802 is substantially similar to that of BCMCC 744. The primary difference between BCMCC 744 and BCMCC 802 is that the latter illustrates the possibility of using a wireless RF interface for communications between rack PLC 720 and BCMCC 802.

FIG. 12 illustrates the use of a modular case control system (BCMCC 1200) configured to provide fixture/case monitoring capabilities, but not case control capabilities. In describing FIG. 12, other advantageous aspects of modular case monitoring and control using a BCMCC will become apparent. The BCMCC 1200 is arranged to receive sensor data from a plurality of digital case sensors (1205, 1207, 1209) via a plurality of display units (e.g., display units 1204, 1206, 1208) over a common digital data transmission channel/line 1212. Such sensor data preferably comprises digital temperature data, as described above with regard to FIG. 11. A single power module 1210, provides power to a single control unit 1202, as well as to all associated display units (1204, 1206, 1208) and the sensors (1205, 1207, 1209). Each display unit associated with BCMCC 1200 provides the sensor data to the control unit 1202. Thus, only one control unit is needed to interface with a plurality of display units in the configuration illustrated in FIG. 11. The control unit 1202 supplies the sensor data received from the display units to rack PLC 720 or, alternatively, a third party controller (e.g., third party control 746 of FIG. 7). Rack PLC 720 can use this information to control, among other things, a compressor (e.g., using BCCSCM 48), a branch valve (e.g., using BCSBM 724), another system valve such as an EEPR valve (e.g., using BCVCM 726), or a condenser (e.g., using BCFCM 736), to achieve temperature control of the cases associated with system 1200.

The configuration illustrated in FIG. 12 may also be used to illustrate another example of how peer-to-peer communication and control are made possible by the use of the distributed intelligence control system of the present invention. The discharge air temperature of each case being monitored by BCMCC 1200 may be determined by an associated digital case sensor. In other words, the discharge air temperature of a first display case in a fixture lineup is monitored by a first digital case sensor (e.g., one of sensors 1205) and provided to control unit 1202 by the first display unit 1204. Differences between control units and display units are discussed above with respect to FIG. 11. Similarly, the discharge air temperature of the second display case is monitored by a second digital case sensor (e.g., one of sensors 1207) and provided to control unit 1202 by the second display unit 1206. This process is repeated for each display unit in the lineup. Control unit 1202 provides the discharge air temperature data to rack PLC 720 over the control network. Rack PLC 720 uses this temperature data to control a liquid line solenoid, via a branch control module (e.g., BCSBM 724) as described above with respect to FIG. 9 to achieve temperature control for the case lineup associated with system 1200.

Another of the many advantages of the distributed intelligence control system of the present invention may be appreciated by reference to the modular case monitoring system illustrated in FIG. 12. A single control unit 1202 may be used to monitor a plurality of display units (e.g., display units 1204, 1206, 1208), but each of the displays/fixtures associated with such display units need not necessarily be on the same refrigeration branch. For instance, if display units 1204 and 1206 are associated with fixtures on a low temperature branch and display unit 1208 is associated with a fixture on another branch, each branch may operate on separate (preferably non-overlapping) defrost schedules (which in the case monitoring configuration illustrated in FIG. 12 would preferably be controlled at the rack by a branch control module or a valve control module). Because the system uses distributed intelligence, control unit 1202 receives information from rack PLC 720 to allow each display to correctly reflect the defrost status of the branch with which it is associated. Thus, using the example above, if the low temperature branch were in a defrost cycle, display units 1204 and 1206 would display a status message indicating as such, while display unit 1208 would continue to display present case temperature information. Accordingly, high degrees of case monitoring and display granularity are maintained despite the fact that only one control unit is used.

FIG. 13 is a block diagram that illustrates a branch control system using a modular case control system 1300 for branch control functions. As illustrated in FIG. 13, the BCMCC 1300 includes a control unit 1302 controlling a plurality of display units 1306, 1308, 1310. A power module 1316 provides a local source of power for BCMCC 1300. The control unit 1302 receives control commands from rack PLC 720 or, alternatively, a third party controller. Control unit 1302 also determines valve position information from an EEPR valve 1304 and provides stepper motor commands to position the EEPR valve 1304 in accordance with commands from rack PLC 720 (or third party controller). Preferably, control unit 1302 determines the valve position of EEPR valve 1304 by monitoring the number of steps applied and comparing that number to a known starting reference. Periodically, the stepper motor may be "re-zeroed" to ensure proper control. When using a BCMCC to provide branch control, the EEPR valve is preferably located with the display case(s) rather than at the main rack with the rack PLC 720. Conversely, when branch control is achieved using a branch control module (e.g., BCSBM 724 of FIG. 9) or a valve control module (e.g., BCVCM 726 of FIG. 10), the EEPR valve is preferably located at the main rack with rack PLC 720.

Referring still to FIG. 13, a commercial refrigeration branch may include one or more display cases (not shown)

associated with the display units 1306, 1308, 1310. A central controller, such as rack PLC 720, maintains branch control by monitoring various parameters associated with the refrigeration system. Such parameters may include, for example, temperature data, compressor data, suction data, and the like. In the branch control system 1300 of FIG. 13, branch control is maintained by controlling the position of EEPR valve 1304. More particularly, rack PLC 720 determines desired set points (e.g., discharge temperature) for the case lineup associated with BCMCC 1300. Control unit 1302 receives the set point information over the control network and determines the appropriate position for EEPR valve 1304 to achieve the desired set point(s). In particular, control unit 1302 includes a stepper motor drive output connected to EEPR valve 1304 via line 1320. Hence, upon receipt of the desired set point from rack PLC 720, control unit 1302 determines the correct valve position and drives EEPR valve 1304 to the desired position, thereby achieving the desired branch control function.

FIG. 13 may also be used to illustrate another example of how peer-to-peer control/communication is available with the distributed intelligence refrigeration control system of the present invention. If the discharge, suction, or motor temperatures are high in every compressor and the valve open positions according to the modular case controllers in the system (e.g., BCMCC 1300) are not fully opened, the compressor controller (e.g., BCCSCM of FIG. 7) will send a signal to the respective control units (e.g., control unit 1302), via rack PLC 720, to open the valves (e.g., EEPR valve 1304). If successful, such control action(s) will reduce internal compressor temperatures and improve efficiency and compressor life expectancy. Similarly, if compressor temperatures are lower than expected (indicating, perhaps, a potential flood back condition that could damage or ruin a compressor), the compressor controller will search the system, via rack PLC 720, to determine which EEPR valves may be open too far. Thereafter the valves will be sequentially closed by sending commands to the respective control units (e.g., control unit 1302), via rack PLC 720.

It should be understood, that the BCMCC 1300 illustrated in FIG. 13 could be modified to provide single case control as well. In other words, BCMCC 1300 could be configured to provide complete branch control, or single case control. It should further be understood that one or more of the display units 1306, 1308, or 1310 may be configured to provide power switching control in a manner described above with respect to FIG. 11. In such a configuration, a power module would be required for each display unit that provides power switching control (see FIG. 11).

As has been explained above, one of the advantages of the present distributed intelligence control system invention is the ease with which such system is installed at a user site. The modular case control concept, exemplary preferred embodiments of which are depicted in FIGS. 11–13, illustrates this point further. For example, each display unit (e.g., display units 1204, 1206, 1208 of FIG. 12 or 1306, 1308, 1310 of FIG. 13) is preferably automatically addressed by its associated control unit (e.g., control unit 1202 in FIG. 12 or control unit 1302 in FIG. 13). In other words, upon installation of the system, the control unit automatically determines how many display units are present, as well as their address/location. More specifically, the control unit automatically determines how many display units are attached. The display units are preferably connected in serial fashion (a serial communication link from the control unit to the first display unit, and then out of the first display unit and into the second display unit, and so on). Each display unit preferably has the ability to disable communications with all other display units that are "downstream" of it on the serial communication channel/link. After power up, all of the display units on a particular link are sent a command to disable their individual communications outputs. At this point, only the control unit and the first display unit are communicating; remaining display units are "cut off." In this way, the control module (e.g., control unit 1202 in FIG. 12) can now uniquely associate a first address with the first display unit (e.g., display unit 1204 in FIG. 12). After the first display unit is addressed, the control unit instructs this first addressed display unit to turn on its communications output, thereby re-connecting the second display unit (e.g., display unit 1206 in FIG. 12) to the link. Now the control module can uniquely associate an address with the second display unit. This process is repeated until all display units are addressed (e.g., until a communications failure occurs indicating no more displays are present).

Further, each display unit preferably polls each digital case sensor (e.g., sensor 1102 of FIG. 11) associated with that display unit to determine the sensors location and type, thereby associating a unique identification/address for each such sensor. The sensor location and type information is forwarded to the control unit associated with that display unit. In a preferred embodiment, each digital case sensor to be used in a given case/fixture is configured in a wire harness prior to installation. Each sensor preferably includes a memory (e.g., an EEPROM) that is preprogrammed with a number that uniquely identifies the type of sensor (e.g., discharge air temperature, return air temperature, inlet temperature, outlet temperature, product temperature, and so on), as well as the location in the case in which it will be installed (e.g., left side, center, right side). In this way, the system is automatically configured upon installation, and end users and system installers are not presented with the complexity of programming/addressing the system at installation time. The digital case sensors are preferably located to provide temperature information that facilitate specific control functions. Such sensors include, for example, discharge air temperature sensors, return air temperature sensors, product temperature sensors, inlet and outlet refrigeration line temperature sensors, and defrost terminate sensors (e.g., sensors located on the evaporator or in the airstream).

Figure 14:
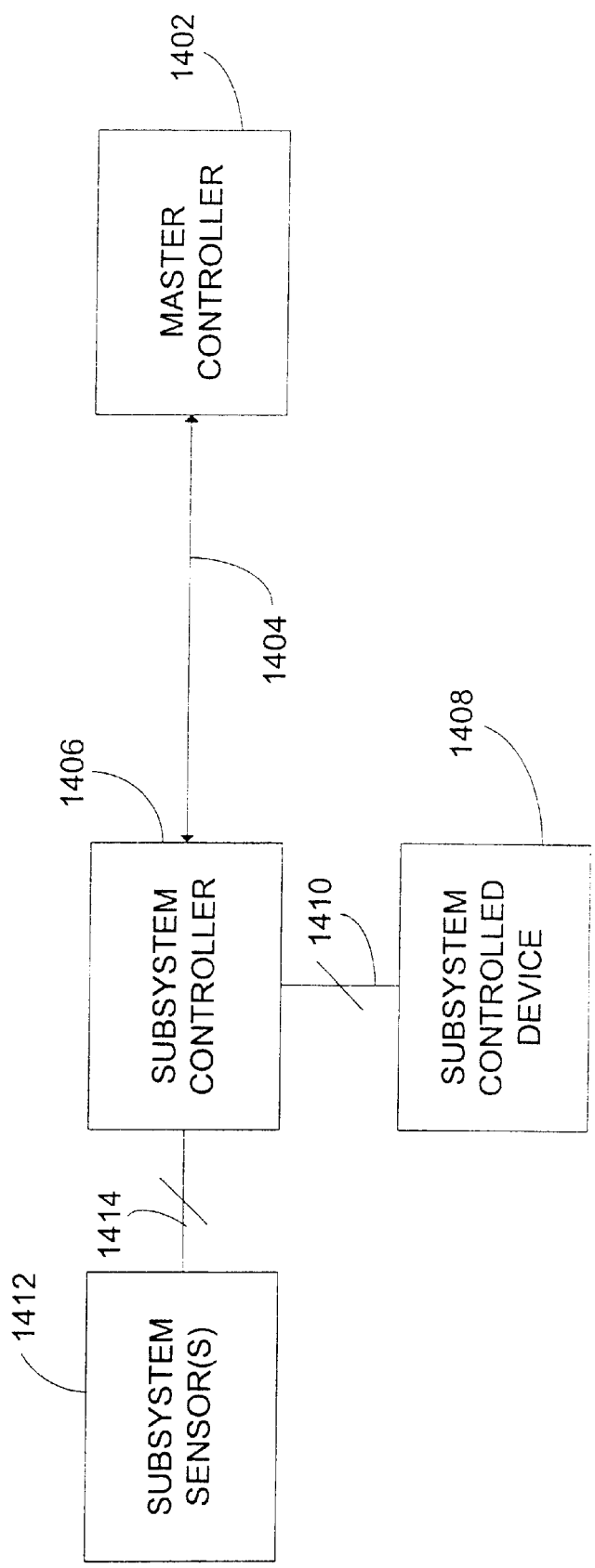
FIG. 14 is a block diagram illustrating the reduced wiring requirements associated with using a distributed intelligence refrigeration control system according to the present invention.

FIG. 14 is a block diagram that helps to illustrate several of the many advantages of using a distributed intelligence refrigeration control system according to the present invention. FIG. 14 will be described by way of a specific example including a fixture using modular case control (see FIGS. 11–13). This description is for illustrative purposes only, and should not be construed as limiting the scope of the present invention.

A master controller 1402 (e.g., rack PLC 720) communicates with a subsystem controller 1406 (e.g., BCMCC 744) over a communication channel 1404. The only wiring between the master controller 1402 and the subsystem controller 1406 is the communication channel 1404; no separate power wiring between them is required. Hence, master controller 1402 and subsystem controller 1406 receive power locally, thereby reducing the installation complexity of the system. Indeed, if communication channel 1404 is a wireless channel, no wiring is required between master controller 1402 and subsystem controller 1406.

Each subsystem controller 1406 in the system is preferably constructed and arranged to operate one or more subsystem controlled devices 1408 (e.g., an EEPR valve, a solenoid valve, a solid state relay, a power switch, and the like) over one or more control lines 1410. Thus, as can now be fully appreciated, where multiple wiring runs may be necessary to provide specific control actions, only local wiring is required. In other words, long runs of control wiring are not required between the master controller and the subsystem control device. For example, an EEPR valve associated with a fixture line up is controlled locally; there is no direct control wiring between the EEPR control valve and the master controller.

Similarly, some subsystem controllers in the system are preferably constructed and arranged to receive sensor input data, at a local level, from subsystem sensors 1412 over one or more sensor data busses 1414. For example, a plurality of subsystem sensors 1412 (e.g., digital case sensors 1307 of FIG. 13) provide case temperature data with respect to a plurality of case monitoring locations. In this example, subsystem sensors 1412 are constructed and arranged to communicate with subsystem controller 1406 (e.g., display unit 1306) over a sensor data bus 1414 (e.g., a single twisted pair communication bus). Subsystem controller 1406 transmits the sensor data to master controller 1402 over communication channel 1404 (e.g., display unit 1306 transmits the data to control unit 1302, which transmits the data to rack PLC 720). Thus, master controller 1402 receives remote sensor data without the need for installing complicated and lengthy wiring between master controller 1402 and the remotely located subsystem sensors 1412.

An Appendix hereto includes a series of tables that provide additional information regarding specific aspects of a preferred embodiment of a commercial refrigeration control system suitable for use with the present invention.

It is to be understood that the foregoing description, the accompanying figures, and the Appendix have been given only by way of illustration and example, and that changes and modifications in the present disclosure, which will be readily apparent to all skilled in the art, are contemplated as within the scope of the present invention, which is limited only by the scope of the appended claims. For example, as explained herein, certain preferred embodiments are described with respect to a multiport (MPI) interface for use with serial, digital communications. Those skilled in the art having the benefit of the present disclosure should understand that other field bus configurations may be used, such as ProfiBUS. ProfiBUS is a published standard, and MPI uses RS-485 at the hardware level but uses a proprietary data protocol from Siemens. Both MPI and ProfiBUS can be implemented in hard wired, wireless, or partially wireless configurations. The use of the term hardwired is intended to include fiber optic systems. Furthermore, although preferred embodiments have been described, in part, in terms of bus systems using serial communication standards, the invention can be enjoyed using serial and/or parallel bus structures.

It should also be understood that while aspects of the invention are disclosed in terms of commercial refrigeration display cases, the invention is not so limited. For example, the embodiments disclosed and described herein may be used in other commercial refrigeration applications such as, for example, cold storage rooms (e.g., meat lockers) and the like, as well as industrial, institutional, and transportational refrigeration systems and the like. Accordingly, the specific structural and functional details disclosed and described herein are provided for representative purposes and represent the preferred embodiments.

Further, for purposes of disclosing the preferred and best embodiments of the present invention, various features have been described by reference to specific terms, such as BCCSCM, BCSBM, BCVCM, and BCMCC. While these terms have been used to ensure disclosure of the preferred embodiments of the present invention, they are the exclusive intellectual property of the assignee of the present application.

In view of the above, it will be seen that the invention provides a wide variety of advantageous features and results. Manufacturing costs are reduced due to the use of fewer materials and components, as compared to non-networked refrigeration systems. Similarly, fabrication and installation is simplified due to the elimination of high voltage wiring, typically required by prior art systems. The use of modularity allows for standardized manufacturing techniques, while still accommodating customer requirements, such as interfacing with third party control and monitoring devices over standardized communication interfaces. Such improvements in manufacturing, fabrication, and installation also translate into improved system serviceability. The increased granularity of the system resulting from using a distributed control architecture increases the fault tolerance of the system. Implementing the system using optional wireless communication links (e.g., via RF links) where relatively large distances exist between networked components eliminates the cost for installing hardwired links. Such optional wireless links, by their nature, provide improved damage resistance from external problems such as lightening strikes, high voltage arcing, or high current transmission in adjoining equipment and wiring. The sources of such types of damage are common in certain geographic locations, and reducing the effects of such sources is an improvement over the prior art.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

APPENDIX

Table I provides, an overview of an exemplary preferred hardware and network connection set for several components of a refrigeration system suitable for use according to the invention illustrated and discussed herein.

TABLE I

| Device | Target Platform | Network Connections |
|---|---|---|
| Rack PLC | Siemens S7-300 CPU314 | AS-i; LonWorks ®/ Echelon; TCP/IP; MPI |
| Condenser PLC | Siemens S7-300 CPU314 | MPI; AS-i |
| Remote HMI | Siemens TP170A | MPI |
| Local HMI | Siemens OP3 | MPI |
| BCCSCM | Atmel AT90S2813 | AS-i |
| BCSBM | Siemens 4 Out AS-i Module | AS-i |
| BCVCM | Atmel AT9052813 | AS-i; LonWorks ®/ Echelon |
| BCFCM | AMI S4 AS-i ASIC | AS-i |
| BCMCC | Echelon Neuron | LonWorks ®/ Echelon |
| Local Workstation | Windows NT | TCP/IP |

Table II provides an overview of an exemplary set of preferred input/output (I/O) devices controlled by rack PLC 720 according to the present invention.

TABLE II

I/O Specifications

| Controlled Devices | Max. | Network | I/O Device |
|---|---|---|---|
| Compressors | 16 | AS-i | BCCSCM |
| System Valves (Motor Actuated) | 256 | LonWorks ®/ Echelon | BCVCM |
| System Valves (Solenoid Actuated) | 64 | AS-i | BCSBM |
| Case Lighting Circuits | 32 | AS-i | AS-I 4 Out |
| Condenser Fans | 16 | MPI | Condenser PLC |
| Satellite Compressor | 2 | AS-i | BCCSCM |
| Suction Groups | 4 | N/A | N/A |

Table III identifies a preferred set of analog inputs, with exemplary ranges, for use by rack PLC 720 to provide refrigeration control in accordance with the invention.

TABLE III

Analog Inputs

| Input | Range | Max. | Network | I/O Device |
|---|---|---|---|---|
| Ambient Temperature | −40°–120° | 1 | MPI | Condenser PLC |
| Liquid Line Temperature | −40°–120° | 1 | Local | S7 Analog I/O |
| Heat Reclaim Pressure | 0–500 PSI | 2 | Local | S7 Analog I/O |
| Receiver Level | 0%–100% | 1 | Local | S7 Analog I/O |
| System Case Temperature | −40°–120° | 256 | LonWorks/ Echelon | BCMCC |
| Suction Pressure | 0–200 PSI | 32 | AS-i | BCCSCM |
| Suction Temperature | −40°–120° | 32 | AS-i | BCCSCM |
| Discharge Pressure | 0–500 PSI | 32 | AS-i | BCCSCM |
| Discharge Temperature | 0°–275° | | AS-i | BCCSCM |
| Compressor Motor Current | 2–100A | 1 per compressor | AS-i | BCCSCM |

Table IV identifies a preferred set of analog inputs, with exemplary ranges, for use by rack PLC 720 to provide refrigeration control in accordance with the invention.

TABLE IV

Digital Inputs

| Input | Range | Max. | Network | I/O Device |
|---|---|---|---|---|
| System Defrost Termination Bi-Metal Thermostat | True/False | 32 | AS-i | BCSBM |
| Heat Reclaim Status | True/False | 1 | Local | S7 Digital I/O |
| Compressor Phase Reversal | True/False | 32 | AS-i | BCCSCM |
| Compressor Phase Loss | True/False | 32 | AS-i | BCCSCM |
| Compressor Internal Protect Fail | True/False | 32 | AS-i | BCCSCM |
| Compressor Run Time | 0–99999 | 32 | AS-i | BCCSCM |
| Compressor Oil Fail | True/False | 32 | AS-i | BCCSCM |
| EEPR Valve Position | 0%–100% | 256 | LonWorks/ Echelon | BCVCM |

Table V identifies a preferred set of capacity-related control functions associated with rack PLC 720.

TABLE V

Capacity Control

| Compressor Cycling Methods | Control Parameter | |
|---|---|---|
| First On First Off | Suction Pressure | Suction Pressure Reset |
| Programmed Sequence (Uneven Comp. capacity) | | |
| Real Time Sequence Reconstruction | | |
| Other Capacity Control | | |
| PWM Control | Pressure/Temperature | |
| Unloader support | Pressure/Temperature | |
| Variable Speed Drive control | Pressure/Temperature | |
| Satellite Control | Pressure/Temperature | |

Table VI identifies a preferred set of system branch control functions associated with rack PLC 720.

TABLE VI

System Branch Control

| Defrost | | Case Temperature Control | |
|---|---|---|---|
| Scheduling/Initiation | TOD Clock | Liquid Line Solenoid Ctrl | EEPR Suction Ctrl |
| Termination | Time Temperature/ Bimetal Thermostat | | |
| Drip Cycle (User selectable duration) | | | |

| Defrost Types | | Case Lighting |
|---|---|---|
| Electric | Heater Ctrl Branch Liquid Line Ctrl | TOD Control |
| Gas | Liquid Line Ctrl | |
| Off Time | Branch Liquid Line Ctrl | |

EEPR = Electronic Evaporator Pressure Regulator

Table VII identifies a preferred set of refrigeration system valve and condenser control functions associated with rack PLC 720.

TABLE VII

Control Parameter

Valve Control

Flooding Valve control

| | | |
|---|---|---|
| Motor Driven | Receiver Level | Discharge Pressure |
| Solenoid Actuated | Receiver Level | Discharge Pressure |
| Heat Reclaim Lockout control | | |
| Solenoid Actuated Main Liquid Valve | Discharge Pressure | H.R. Coil Pressure |
| Motor Driven Solenoid Actuated Receiver Pressure Regulator | Discharge Pressure Pressure/Temperature | Receiver Pressure |
| Motor Driven Auto Surge Valve | Discharge Pressure | Receiver Pressure |
| Motor Driven Split Condenser Valve | | |
| Solenoid Actuated/Motor Driven | Discharge Pressure/Condenser Fan History | |

Condenser Control

| Function | |
|---|---|
| Fan Cycling | Discharge Pressure/Liquid Refrigerant Temp. |
| Condenser Split | Discharge Pressure/Outdoor Ambient Temp. |

Tables VIIIA and VIIIB identify a preferred set of alarm conditions for the refrigeration system controlled by rack PLC 720. Table VIIIA identifies conditions having separate alarms associated with hi conditions and low conditions. Table VIIIB identifies conditions having a single system alarm. Both Table VIIIA and VIIIB identify, whether the condition is logged, whether the condition is displayed in real time, a preferred minimum update interval (MUI), and the accuracy of the measured condition.

TABLE VIIIA

Monitoring and Alarm

| Label | Source | Hi Alarm | Lo Alarm | Data Log | RT Disp | MUI | Acc. |
|---|---|---|---|---|---|---|---|
| Suction Pressure | BCCSCM | Yes | Yes | Yes | Yes | .5 sec | .1 PSI |
| Suction Temp | BCCSCM | Yes | Yes | Yes | Yes | .5 sec | .5° |
| Discharge Pressure | BCCSCM | Yes | Yes | Yes | Yes | .5 sec | 1 PSI |
| Discharge Temp | BCCSCM | Yes | Yes | Yes | Yes | .5 sec | 1° |
| Case Temp | BCMCC/ Local I/O | Yes | Yes | Yes | Yes | .5 sec | .5° |
| Ambient Temp | Condenser PLC | N/A | N/A | Yes | Yes | .5 sec | .5° |
| Liquid Line Temp | Local I/O | N/A | N/A | Yes | Yes | .5 sec | 1° |
| Receiver Pres. | Local I/O | N/A | N/A | Yes | Yes | .5 sec | 1 PSI |
| Receiver Level | Local I/O | Yes | Yes | Yes | Yes | .5 sec | 1% |
| Liquid Pres. | Local I/O | | N/A | Yes | Yes | .5 sec | 1 PSI |
| Motor Current | BCCSCM | Yes | Yes | Yes | Yes | .5 sec | ±2A |

TABLE VIIIB

Monitoring and Alarm (cont.)

| Label | Source | System Alarm | Data Log | RT Disp | MUI | Acc. |
|---|---|---|---|---|---|---|
| Def/Ref Status | Internal Clock | N/A | Yes | Yes | N/A | N/A |
| Oil Fail | BCCSCM | Yes | Yes | N/A | .5 sec | N/A |
| Phase Loss | BCCSCM | Yes | Yes | N/A | .5 sec | N/A |
| Phase Reversal | BCCSCM | Yes | No | N/A | .5 sec | N/A |
| Comp Internal | BCCSCM | Yes | Yes | N/A | .5 sec | N/A |
| Heat Reclaim L.O. | Local I/O | N/A | N/A | Yes | .5 sec | N/A |
| Heat Reclaim Stat. | HVAC Input | N/A | Yes | Yes | .5 sec | N/A |
| Auto Surge Valve Stat* | BCVCM | N/A | Yes | Yes | .5 sec | .1% |
| Main Liq Line Pres | BCVCM | N/A | Yes | Yes | .5 sec | |
| Differential Valve | | | % Pos | % Pos | | |
| Split Cond Stat | Internal | N/A | Yes | Yes | .5 sec | N/A |
| Flooding Valve Stat | BCVCM | N/A | Yes | Yes | .5 sec | .1% |
| | | | % Pos | % Pos | | |
| Receiver Pres Reg | BCVCM | N/A | Yes | Yes | .5 sec | .1% |
| All Comp Off | Internal | Yes | N/A | N/A | N/A | N/A |
| Cond Fan Status | Internal | N/A | Yes | Yes | .5 sec | N/A |

Table IX illustrates aspects of a preferred embodiment of a local HMI device 754, suitable for use in the commercial refrigeration systems depicted in FIGS. 7 and 8.

TABLE IX

Hardware Detail

| Siemens TP 170A | Siemens Part No. |
|---|---|
| TP 170A | 6AV6545-0BA15-2AX0 |

I/O Specifications

| Controlled Devices | Range | Max. | Network | I/O Device |
|---|---|---|---|---|
| Alarm Output | N/A | 1 | N/A | N.O. Relay |

Functions

| System Configuration | Status Display |
|---|---|
| Site Layout | Refrigeration Status |
| Branch System Configuration | Branch System Status |
| Refrigeration Configuration | Alarm Status |
| Alarm Configuration | Condenser Status |
| Data Logging Configuration | Site Status |
| Diagnostic Display | Maintenance Display |
| Historical Graphing | I/O Forcing |
| Real Time Graphing | Run Time Meter Maintenance |
| Alarm History | Set Clocks |
| User Logs | Clear History |

Table X illustrates aspects of a preferred embodiment of a remote HMI device 752, suitable for use in the commercial refrigeration systems depicted in FIGS. 7 and 8.

TABLE X

| Hardware Detail | |
|---|---|
| Siemens OP3 | Siemens Part No. |
| OP3 | 6AV3503-1DB10 |
| I/O Specifications | | | | |
|---|---|---|---|---|
| Controlled Devices | Range | Max. | Network | I/O Device |
| None | N/A | 0 | N/A | N/A |

| Functions | |
|---|---|
| System Configuration | Status Display |
| Local Branch System Configuration | Refrigeration Status |
| Local Refrigeration Configuration | Branch System Status |
| Rack Alarm Configuration | Alarm Status |
| | Condenser Status |
| Diagnostic Display | Maintenance Display |
| Alarm History | I/O Forcing |
| | Run Time Meter Maintenance |
| | Set Clock |
| | Clear History |

What is claimed is:

1. A commercial refrigeration system suitable for use in a supermarket, said system comprising:
   at least one fixture;
   an evaporator constructed and arranged for cooling the at least one fixture;
   a refrigerant supply line supplying a pressurized refrigerant to the evaporator;
   a master controller selectively supplying a fixture control signal having a parameter indicative of a desired fixture control action for the at least one fixture;
   at least one fixture sensor associated with the at least one fixture;
   the at least one fixture sensor being constructed and arranged to provide a fixture status signal having a parameter representative of an operating condition associated with the at least one fixture;
   a communication channel extending from the master controller;
   a fixture controller in communication with the master controller over the communication channel;
   the fixture controller receiving the fixture control signal over the communication channel and affecting the operation of the fixture controller in response to the fixture control signal; and
   the fixture controller being constructed and arranged for receiving the fixture status signal from the at least one fixture sensor and supplying the fixture status signal to the master controller over the communication channel.

2. The commercial refrigeration system of claim 1 wherein the communication channel comprises a wireless communication channel.

3. The commercial refrigeration system of claim 1 wherein the fixture controller comprises:
   a fixture control module, said fixture control module communicating with the master controller over the communication channel;
   a fixture display module receiving the fixture status signal from the at least one fixture sensor, said fixture display module supplying the fixture status signal to the control module for transmission to the master controller over the communication channel;
   the fixture display module providing a switch control signal for selectively operating a control function associated with the at least one fixture;
   a switch associated with the fixture display module; and
   the switch receiving the switch control signal from the fixture display module and initiating the control function associated with the at least one fixture in response thereto.

4. The commercial refrigeration system of claim 3 wherein the switch control signal comprises at least one of an anti-sweat control signal selectively controlling an anti-sweat switch associated with the at least one fixture, a defrost signal controlling a defrost switch associated with the at least one fixture, and a light control signal controlling a light switch associated with the at least one fixture.

5. The commercial refrigeration system of claim 3 further comprising a fixture digital data bus extending between the display module and the at least one fixture sensor, wherein the at least one fixture sensor comprises a plurality of temperature sensors, each of said plurality of temperature sensors providing digital temperature data to the display module over the fixture digital data bus.

6. The commercial refrigeration system of claim 5 wherein the fixture data bus comprises a single twisted pair data bus such that only one data bus is required to facilitate communication between the fixture controller and the plurality of temperature sensors.

7. The commercial refrigeration system of claim 1 wherein the fixture controller selectively supplies a pressure control signal having a parameter indicative of a desired pressure setting for the pressurized refrigerant, and wherein the commercial refrigeration system further comprises an evaporator pressure regulator valve responsive to the pressure control signal for controlling a pressure of the pressurized refrigerant.

8. The commercial refrigeration system of claim 7 wherein the fixture controller determines the desired pressure setting as a function of the fixture status signal.

9. The commercial refrigeration system of claim 7 wherein the master controller determines the desired pressure setting as a function of the fixture status signal.

10. The commercial refrigeration system of claim 1 wherein the operating condition comprises a system pressure.

11. The commercial refrigeration system of claim 1 wherein the operating condition comprises a system temperature.

12. A commercial refrigeration system suitable for use in a supermarket, said system comprising:
    at least one fixture;
    an evaporator constructed and arranged for cooling the at least one fixture;
    a refrigerant supply line supplying a pressurized refrigerant to the evaporator;
    a master controller;
    a fixture controller;
    at least one fixture sensor associated with the at least one fixture;
    the at least one fixture sensor being constructed and arranged to provide a fixture status signal to the fixture controller, said fixture status signal having a parameter representative of an operating condition associated with the at least one fixture;
    a communication channel extending from the master controller to the fixture controller;

the master controller selectively supplying a fixture set point signal to the fixture controller over the communication channel, said fixture set point signal having a parameter indicative of an operating set point for the at least one fixture; and the fixture controller being responsive to the fixture set point signal for determining a fixture control action.

13. The commercial refrigeration system of claim 12 further comprising a pressure regulator valve having a plurality of valve positions, wherein the fixture controller selectively supplies a pressure valve control signal to the pressure regulator valve, said pressure valve control signal having a parameter representative of a desired valve position for the pressure regulator valve and wherein the determined fixture control action comprises determining the desired valve position as a function of the fixture set point signal.

14. The commercial refrigeration system of claim 12 further comprising a switching module, the fixture controller selectively providing a switch control signal to the switching module for operating a switch controlled function associated with the at least one fixture wherein the determined fixture control action comprises determining the switch controlled function as a function of the fixture set point signal.

15. The commercial refrigeration system of claim 14 wherein switch control function comprises at least one of controlling an anti-sweat heater associated with the at least one fixture, controlling a defrost cycle associated with the at least one fixture, and controlling a light associated with the at least one fixture.

16. The commercial refrigeration system of claim 12 wherein the communication channel comprises a wireless communication channel such that no wiring is required between the fixture controller and the master controller.

17. A commercial refrigeration system suitable for use in a supermarket, said system comprising:
- at least one fixture;
- an evaporator constructed and arranged for cooling the at least one fixture;
- a refrigerant supply line supplying a pressurized refrigerant to the evaporator;
- a master controller;
- at least one fixture sensor associated with the at least one fixture;
- the at least one fixture sensor being constructed and arranged to provide a digital fixture status signal having a parameter representative of an operating condition associated with the at least one fixture;
- a communication channel extending from the master controller;
- a fixture controller in communication with the master controller over the communication channel; and
- the fixture controller being constructed and arranged for receiving the digital fixture status signal from the at least one fixture sensor and supplying the fixture status signal to the master controller over the communication channel.

18. A commercial refrigeration system suitable for use in a supermarket, said system comprising:
- at least one fixture;
- an evaporator constructed and arranged for cooling the at least one fixture;
- a refrigerant supply line supplying a pressurized refrigerant to the evaporator;
- a master controller;
- a plurality of fixture sensors associated with the at least one fixture;
- the plurality of fixture sensors being constructed and arranged to provide a plurality of fixture status signals, each of said plurality of fixture status signals having a parameter representative of an operating condition associated with the at least one fixture;
- a first communication channel extending from the master controller;
- a fixture controller in communication with the master controller over the first communication channel;
- a second communication channel extending from the plurality of fixture sensors to the fixture controller; and
- the fixture controller being constructed and arranged for receiving the plurality of fixture status signals from the plurality of fixture sensors over the second communication channel and supplying the plurality of fixture status signals to the master controller over the first communication channel.

19. The commercial refrigeration system of claim 18 wherein the second communication channel comprises a single twisted wiring pair such that each of the plurality of fixture sensors communicates with the fixture controller over the single twisted wiring pair.

* * * * *